US012577758B2

(12) United States Patent
    Kovanen et al.

(10) Patent No.: US 12,577,758 B2
(45) Date of Patent: Mar. 17, 2026

(54) METHOD FOR DETERMINING LOCATION AND ORIENTATION OF EARTHWORKS MACHINE IN WORKSITE

(71) Applicant: Novatron Oy, Pirkkala (FI)

(72) Inventors: Tuomas Kovanen, Pirkkala (FI); Antti Kolu, Pirkkala (FI); Petri Moisio, Pirkkala (FI); Mikko Vesanen, Pirkkala (FI); Arto Anttila, Tampere (FI); Niko Haaraniemi, Pirkkala (FI)

(73) Assignee: Novatron Oy, Pirkkala (FI)

( * ) Notice: Subject to any disclaimer, the term of this patent is extended or adjusted under 35 U.S.C. 154(b) by 282 days.

(21) Appl. No.: 18/288,602

(22) PCT Filed: May 20, 2022

(86) PCT No.: PCT/FI2022/050346
    § 371 (c)(1),
    (2) Date: Oct. 27, 2023

(87) PCT Pub. No.: WO2022/248766
    PCT Pub. Date: Dec. 1, 2022

(65) Prior Publication Data
    US 2024/0218635 A1      Jul. 4, 2024

(30) Foreign Application Priority Data

May 26, 2021      (FI) ...................................... 20215623

(51) Int. Cl.
    *E02F 9/26*          (2006.01)
    *G06T 7/73*          (2017.01)
(52) U.S. Cl.
    CPC ................ *E02F 9/262* (2013.01); *G06T 7/73* (2017.01); *G06T 2207/30252* (2013.01)

(58) Field of Classification Search
    CPC ......... E02F 9/262; E02F 9/2054; E02F 9/261; G06T 7/73; G06T 2207/30252; G01C 21/005; G01C 21/20; G01C 21/3826
    (Continued)

(56) References Cited

U.S. PATENT DOCUMENTS 11,527,061 B1 * 12/2022 Gray .................... G06V 20/176
    2011/0311342 A1 * 12/2011 Montgomery .......... E02F 9/264
                                                    414/685
    (Continued)

FOREIGN PATENT DOCUMENTS

CA          302554      * 5/2019 ............. B61K 13/00
    CN      112801077 A      5/2021
    (Continued)

OTHER PUBLICATIONS

Office Action issued in Japanese Patent Application No. 2023-567918, Oct. 30, 2024, 4 pages.
    (Continued)

*Primary Examiner* — Jerome Grant, II
(74) *Attorney, Agent, or Firm* — FisherBroyles, LLP

(57)          ABSTRACT

A method for determining a location and orientation of an earthworks machine in a worksite which comprises setting at least one positioning camera on the earthworks machine, determining from a worksite environment a plurality of distinguishable features as a plurality of map feature points, taking two-dimensional positioning images by at least one positioning camera, detecting distinguishable features from the two-dimensional positioning images as navigation feature points, and matching identification information of the navigation feature points with identification information of the plurality of map feature points for determining the location and orientation of the earthworks machine in the worksite.

16 Claims, 10 Drawing Sheets

(58) Field of Classification Search
USPC .......................................................... 382/190
See application file for complete search history.

(56) References Cited

U.S. PATENT DOCUMENTS

| | | | |
|---|---|---|---|
| 2012/0121161 A1 | 5/2012 | Eade et al. | |
| 2014/0118536 A1 | 5/2014 | Morin et al. | |
| 2019/0050997 A1 | 2/2019 | Scholl et al. | |
| 2019/0113936 A1* | 4/2019 | Anderson ................ | G08G 5/55 |
| 2019/0161939 A1 | 5/2019 | Hokkanen et al. | |

FOREIGN PATENT DOCUMENTS

| | | | | |
|---|---|---|---|---|
| DE | 202017104706 | * 8/2017 | ............. | B66C 25/04 |
| DE | 102018218155 | * 5/2019 | ............. | G06F 17/40 |
| EP | 3086196 A1 | 10/2016 | | |
| JP | 2019143995 A | 9/2019 | | |
| JP | 2021050542 A | 4/2021 | | |
| TW | 201337306 | * 9/2013 | .......... | G01C 15/002 |
| WO | 2015181561 A1 | 12/2015 | | |
| WO | 2017172778 A1 | 10/2017 | | |
| WO | 2020059220 A1 | 3/2020 | | |
| WO | 2022248766 A1 | 12/2022 | | |

OTHER PUBLICATIONS

International Search Report and Written Opinion Received for PCT Application No. PCT/FI2022/050346, dated Oct. 4, 2022, 14 pages.
Search Report Received for Finnish Patent Application No. 20215623, dated Sep. 24, 2021, 3 pages.
Feng et al., "Marker-Assisted Structure from Motion for 3D Environment Modeling and Object Pose Estimation", URL: https://doi.org/10.1061/9780784479827.25, pp. 2604-2613, 2016.
Feng et al., "Vision-Based Articulated Machine Pose Estimation for Excavation Monitoring and Guidance", URL: 10.22260/ISARC2015/0029, 9 pages, Jun. 2015.

Figure 5A:
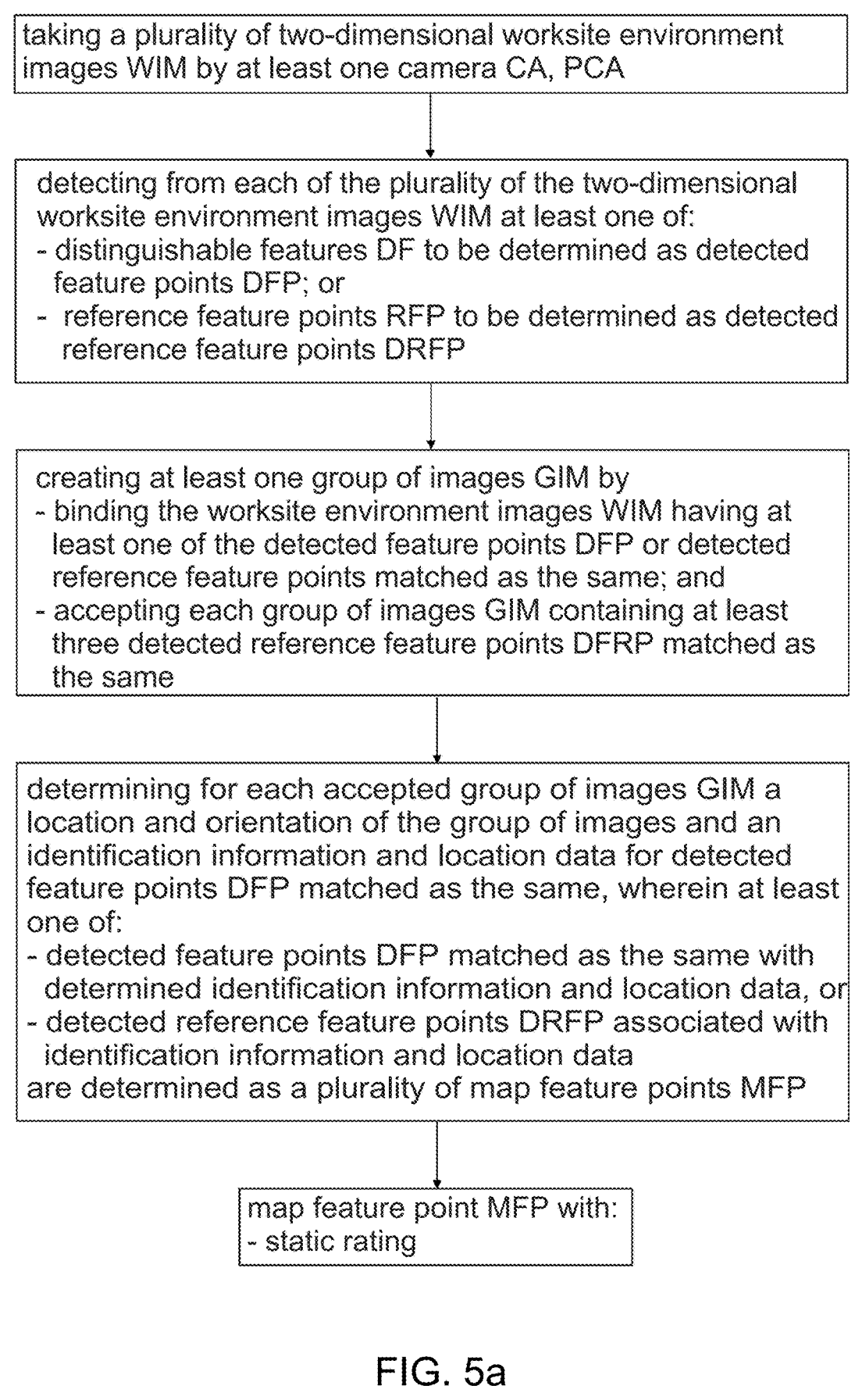

* cited by examiner taking a plurality of two-dimensional worksite environment images WIM by at least one camera CA, PCA detecting from each of the plurality of the two-dimensional worksite environment images WIM at least one of:
- distinguishable features DF to be determined as detected feature points DFP; or
- reference feature points RFP to be determined as detected reference feature points DRFP creating at least one group of images GIM by
- binding the worksite environment images WIM having at least one of the detected feature points DFP or detected reference feature points matched as the same; and
- accepting each group of images GIM containing at least three detected reference feature points DFRP matched as the same determining for each accepted group of images GIM a location and orientation of the group of images and an identification information and location data for detected feature points DFP matched as the same, wherein at least one of:
- detected feature points DFP matched as the same with determined identification information and location data, or
- detected reference feature points DRFP associated with identification information and location data
are determined as a plurality of map feature points MFP map feature point MFP with:
- static rating

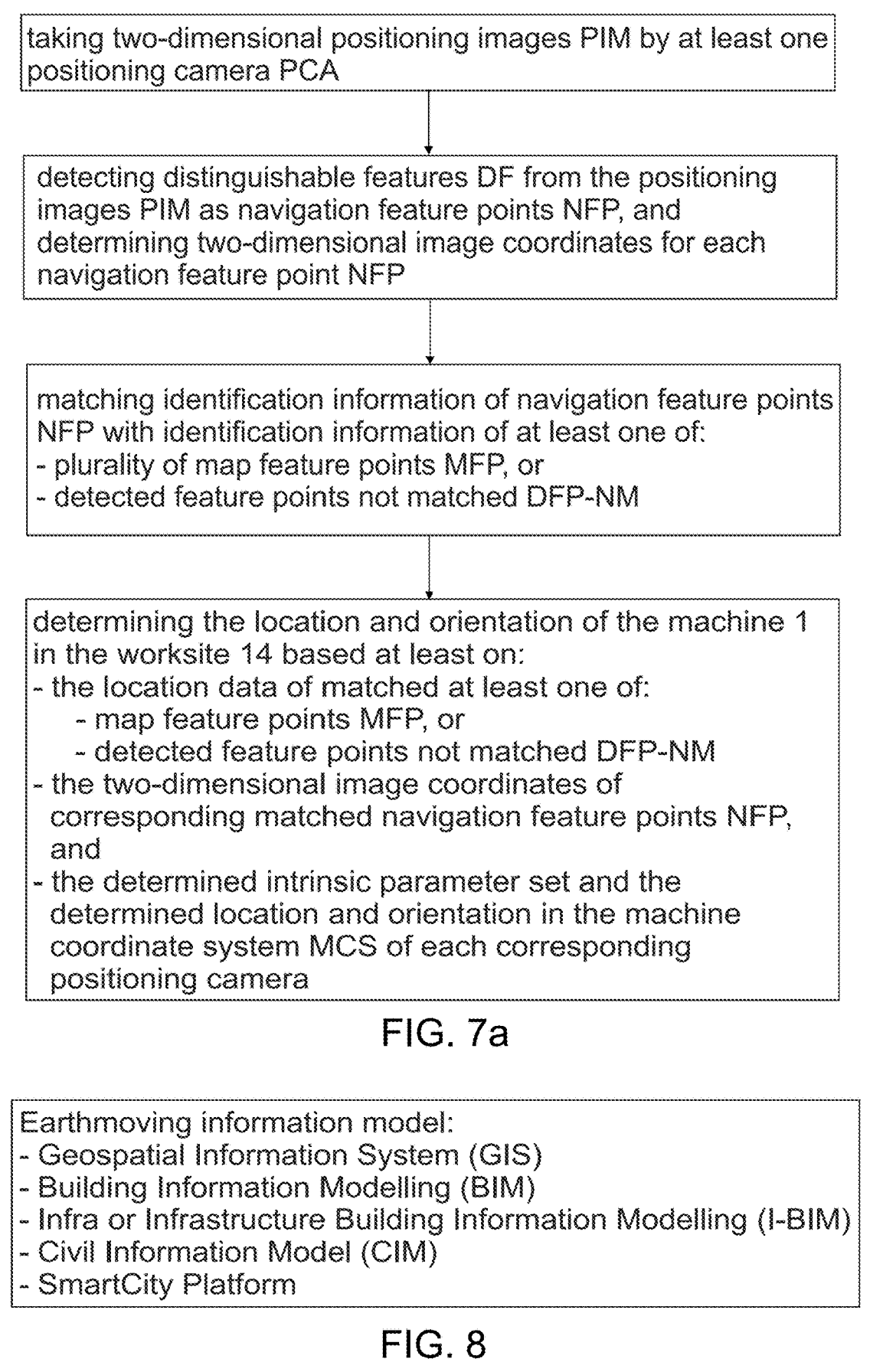

FIG. 5a taking two-dimensional positioning images PIM by at least one positioning camera PCA detecting distinguishable features DF from the positioning images PIM as navigation feature points NFP, and determining two-dimensional image coordinates for each navigation feature point NFP matching identification information of navigation feature points NFP with identification information of at least one of:
- plurality of map feature points MFP, or
- detected feature points not matched DFP-NM determining the location and orientation of the machine 1 in the worksite 14 based at least on:
- the location data of matched at least one of:
    - map feature points MFP, or
    - detected feature points not matched DFP-NM
- the two-dimensional image coordinates of corresponding matched navigation feature points NFP, and
- the determined intrinsic parameter set and the determined location and orientation in the machine coordinate system MCS of each corresponding positioning camera

FIG. 7a

Earthmoving information model:
- Geospatial Information System (GIS)
- Building Information Modelling (BIM)
- Infra or Infrastructure Building Information Modelling (I-BIM)
- Civil Information Model (CIM)
- SmartCity Platform

FIG. 8

PIM

PCA

1

14

METHOD FOR DETERMINING LOCATION AND ORIENTATION OF EARTHWORKS MACHINE IN WORKSITE

CROSS-REFERENCE TO RELATED APPLICATIONS

This application is a National Stage application of International Application No. PCT/FI2022/050346, filed May 20, 2022, which claims benefit and priority to Finnish Application No. 20215623, filed May 26, 2021, which are incorporated by reference herein in their entireties.

BACKGROUND

Field

The invention relates to a method for determining a location and orientation of an earthworks machine in a worksite.

SUMMARY

Different types of earthworks machines may be utilized at different earth moving worksites for example for moving soil or rock material from one location to another. Examples of this kind of worksites include for example substructure construction worksites or housing construction worksites for buildings and road construction worksites. The earthworks machines like that are for example excavators and bulldozers.

The earthworks machines and the working tools of the earthworks machines should be able to be positioned and operated very accurately in the worksite in order to execute designed operations properly. The information regarding an accurate location and orientation of the earthworks machine and the tool thereof may be shown to an operator of the earthworks machine so that the operator may use the information when controlling the tool and the machine. This accurate location and orientation information of the machine and the tool thereof is especially important when it is utilized in semiautomatic or fully automatic earthworks machines, i.e., in earthworks machines operating at least some time without a constant control by an operator of the machine, and whereby possible misplacement of the machine or its tool is not immediately rectified by the operator of machine.

Generally automatic positioning of the machine may be based for example on a satellite-based positioning system GNSS (Global Navigation Satellite Systems), such as GPS (US), GLONASS (RU), Galileo (EU) or Compass (CN). Alternatively, the positioning of the earthworks machine may be provided by means of a total station positioned to the worksite.

However, in every worksite or in every earthworks machine there is not necessarily any or accurate enough satellite-based positioning system available, or a connection to the satellite may become interrupted due to obstacles remaining or reaching above the earthworks machine. Additionally, a setup of the total station-based positioning system in the worksite may be laborious especially if the total station-based system should be removed from the work site daily or many times each day.

Therefore, there is a need for an alternative positioning solution.

An object of the present invention is to provide a novel method for determining a location and orientation of an earthworks machine in a worksite.

The invention is characterized by the features of the independent claim.

The invention is based on the idea of identifying from a worksite a plurality of distinguishable features to be applied as unique map feature points each of them having identification information comprising at least a unique identifier, like a feature descriptor, and location data comprising at least one of: three-dimensional location thereof in a worksite environment or two-dimensional image coordinates with image identifier. The map feature points with identification information and location data are used to realize a visual localization method for work machines, in which localization error stays in controllable, i.e., in acceptable level instead of accumulating over time. Special attention is paid in georeferencing the plurality of distinguishable features to be applied as unique map feature points.

An advantage of the invention is an accurate feature point map to be applied for determining a location and orientation of an earthworks machine in a worksite.

Some embodiments of the invention are disclosed in the dependent claims.

According to an embodiment of the method for determining a location and orientation of an earthworks machine in a worksite, the method comprises setting at least one positioning camera on the earthworks machine, the at least one positioning camera having: a determined intrinsic parameter set, where the intrinsic parameter set defines for images the formation of each image pixel from a real-world view and a determined location and orientation in a machine coordinate system; and determining from a worksite environment a plurality of distinguishable features as a plurality of map feature points, wherein the plurality of map feature points has at least identification information and location data, wherein identification information comprises at least a unique identifier and location data comprises at least one of: three-dimensional location in the worksite or two-dimensional image coordinates with image identifier; and taking two-dimensional positioning images by at least one positioning camera; detecting distinguishable features from the two-dimensional positioning images as navigation feature points and determining two-dimensional image coordinates and identification information for each navigation feature point; and matching identification information of the navigation feature points with the identification information of at least one of: the plurality of map feature points or detected feature points not matched; wherein determining the location and orientation of the earthworks machine in the worksite based at least on the location data of matched at least one of: map feature points or detected feature points not matched, the two-dimensional image coordinates of corresponding matched navigation feature points, and the determined intrinsic parameter set and the determined location and orientation in the machine coordinate system of each corresponding positioning camera.

According to an embodiment of the method, it is determined a location and orientation of an earthworks machine in a worksite coordinate system, the method comprising:

generating a feature point map by determining from a worksite environment a plurality of distinguishable features as a plurality of map feature points by taking a plurality of two-dimensional worksite environment images by at least one camera having determined intrinsic parameter set, where the intrinsic parameter set defines for images the formation of each image pixel from a real-world view;

detecting from each of the plurality of two-dimensional worksite environment images at least one of:

distinguishable features for associating each distinguishable feature with identification information and image coordinates of the respective two-dimensional worksite environment image as detected feature points; or distinguishable features as reference feature points, wherein the reference feature points are preset in a worksite and associated with identification information and location data in the worksite coordinate system, for additionally associating each of the reference feature points with image coordinates of the respective two-dimensional worksite environment image as detected reference feature points;

creating at least one group of images by binding the worksite environment images with each other by having at least five at least one of: the detected feature points or the detected reference feature points matched as the same points in the worksite environment images to be bound;

accepting each group of images containing at least two worksite environment images and at least three detected reference feature points matched as the same points; and determining for each accepted group of images a location and orientation of the group of images and an identification information and location data for detected feature points matched as the same points by utilizing the identification information and location data of the at least three detected reference feature points contained; wherefrom the detected feature points matched as the same points and the detected reference feature points matched as the same points are determined as map feature points for the feature point map;

wherein the plurality of map feature points of the feature point map has at least identification information and location data, wherein the identification information comprises at least a unique identifier identifying the distinguishable feature; and the location data comprises three-dimensional location in the worksite coordinate system;

setting at least one positioning camera on the earthworks machine, the at least one positioning camera having the determined intrinsic parameter set and a determined location and orientation in a machine coordinate system;

providing the earthworks machine with the feature point map;

taking two-dimensional positioning images by at least one positioning camera;

detecting distinguishable features from the two-dimensional positioning images as navigation feature points and determining two-dimensional image coordinates and identification information for each navigation feature point; and matching identification information of the navigation feature points with the identification information of the map feature points of the feature point map; wherein determining the location and orientation of the earthworks machine in the worksite coordinate system based at least on:

the location data of matched map feature points;

the two-dimensional image coordinates of corresponding matched navigation feature points; and the determined intrinsic parameter set and the determined location and orientation in the machine coordinate system of each corresponding positioning camera.

According to an embodiment of the method, the step of determining from a worksite environment a plurality of distinguishable features as a plurality of map feature points comprises taking a plurality of two-dimensional worksite environment images by at least one camera having determined intrinsic parameter set, detecting from each of the plurality of two-dimensional worksite environment images at least one of: distinguishable features for associating each distinguishable feature with identification information and image coordinates of the respective two-dimensional worksite environment image as detected feature points; or reference feature points, wherein reference feature points are preset in the worksite and associated with identification information and location data, for additionally associating each of the reference feature points with image coordinates of respective two-dimensional worksite environment image as detected reference feature points, creating at least one group of images by binding the worksite environment images with each other by having at least one of: the detected feature points or the 25 detected reference feature points matched as the same points in the worksite environment images to be bound; and accepting each group of images containing at least two worksite environment images and at least three detected reference feature points matched as the same points; determining for each accepted group of images a location and orientation of the group of images and an identification information and location data for detected feature points matched as the same by utilizing the identification information and location data of the at least three detected reference feature points contained; wherein at least one of: the detected feature points matched as the same points with determined identification information and location data or detected reference feature points matched as the same points and associated with identification information and location data are determined as a plurality of map feature points.

According to an embodiment of the method, the step of determining from a worksite environment a plurality of distinguishable features as a plurality of map feature points comprises taking a plurality of two-dimensional worksite environment images by at least one camera, the at least one camera having a determined intrinsic parameter set and a determined location in the worksite coordinate system; detecting from each of the plurality of two-dimensional worksite environment images distinguishable features and determining the distinguishable feature with image coordinates of respective two-dimensional worksite environment image as detected feature points, creating at least one group of images having detected feature points matched as the same points in the worksite environment images; and determining for each group of images an identification information and location data for detected feature points matched as the same by utilizing the location in the worksite coordinate system of the at least one camera with each respective two-dimensional worksite environment image, wherein the detected feature points matched as the same with determined identification information and location data are determined as a plurality of map feature points.

According to an embodiment of the method, the step of determining from a worksite environment a plurality of distinguishable features as a plurality of map feature points the map feature points are determined at least in part from data retrieved from an earthmoving information model, wherein the earthmoving information model is based on at least one of: Geospatial Information System (GIS), Building Information Modelling (BIM), Infra or Infrastructure Building Information Modelling (I-BIM), Civil Information Model (CIM) or SmartCity Platform.

According to an embodiment of the method, the step of determining from a worksite environment a plurality of distinguishable features as a plurality of map feature points further comprises further map feature points determined at least in part from data retrieved from an earthmoving information model, wherein the earthmoving information model is based on at least one of: Geospatial Information System (GIS), Building Information Modelling (BIM), Infra or Infrastructure Building Information Modelling (I-BIM), Civil Information Model (CIM) or SmartCity Platform.

According to an embodiment of the method, the step of determining from a worksite environment a plurality of distinguishable features as a plurality of map feature points the map feature points are determined as a combined set of the map feature points determined according to the methods as disclosed in at least two claims of claim 1, 2 or 3.

According to an embodiment of the method, the step of determining for each accepted group of images a location and orientation of the group of images and an identification information and location data for detected feature points matched as the same further comprises determining a static rating for the detected feature points matched as the same by utilizing the identification information and location data of the at least three detected reference feature points contained, wherein at least one of: the detected feature points matched as the same with determined identification information, location data and the static rating or detected reference feature points associated with identification information and location data are determined as a plurality of the map feature points.

According to an embodiment of the method, determining for each group of images an identification information and location data for detected feature points matched as the same further comprises determining static rating for the detected feature points matched as the same by utilizing the location in the worksite coordinate system of the at least one camera with each respective two-dimensional worksite environment image, wherein the detected feature points matched as the same with determined identification information, location data and static rating are determined as a plurality of the map feature points.

According to an embodiment of the method, the method further comprises determining overall rating, the overall rating comprising at least one of: static rating or dynamic rating, and the dynamic rating is determined for each of the plurality of the determined map feature points with regards to each positioning camera individually taking into account previously determined location and orientation of each of the at least one positioning camera.

According to an embodiment of the method, the overall rating is at least one of: the static rating or the dynamic rating, and the overall rating is at least two-tiered.

According to an embodiment of the method, at least the map feature points having the lowest-tiered overall rating are discarded if the amount of a plurality of the map feature points is above threshold, wherein the threshold is determined at least one of: manually or automatically.

According to an embodiment of the method, the step of determining the location and orientation of the earthworks machine in the worksite is further based on tracking navigation feature points between successive positioning images, wherein the navigation feature points tracked between the successive positioning images indicate the change in location and orientation of the positioning camera.

According to an embodiment of the method, the method further comprises determining the location and orientation of the earthworks machine in an earthworks information model, wherein earthworks information is based on at least one of Geospatial Information System (GIS), Building Information Modelling (BIM), Infra or Infrastructure Building Information Modelling (I-BIM), Civil Information Model (CIM) and SmartCity Platform.

According to an embodiment of the method, the method further comprises controlling a tool of the earthworks machine to create a structure described in the earthworks information model.

According to an embodiment of the method, the method further comprises generating as-built data to be accompanied with the earthworks information model.

According to an embodiment of the method, the method further comprises transmitting as-built data to at least one of worksite information management system or a machine operating at the worksite.

BRIEF DESCRIPTION OF THE DRAWINGS

In the following the invention will be described in greater detail by means of preferred embodiments with reference to the accompanying drawings, in which

FIGS. 5*a*, 5*b*, 5*c* and 5*d* show schematically an embodiment for determining map feature points for creating a feature point map.

FIGS. 7*a*, 7*b* and 7*c* show schematically, in view of FIGS. 2*a* and 2*b*, embodiments for determining the location and orientation of the machine in the worksite;

FIG. 8 discloses schematically some earthmoving information models; and

For the sake of clarity, the figures show some embodiments of the invention in a simplified manner. Like reference numerals identify like elements in the Figures.

DETAILED DESCRIPTION

Figure 1:
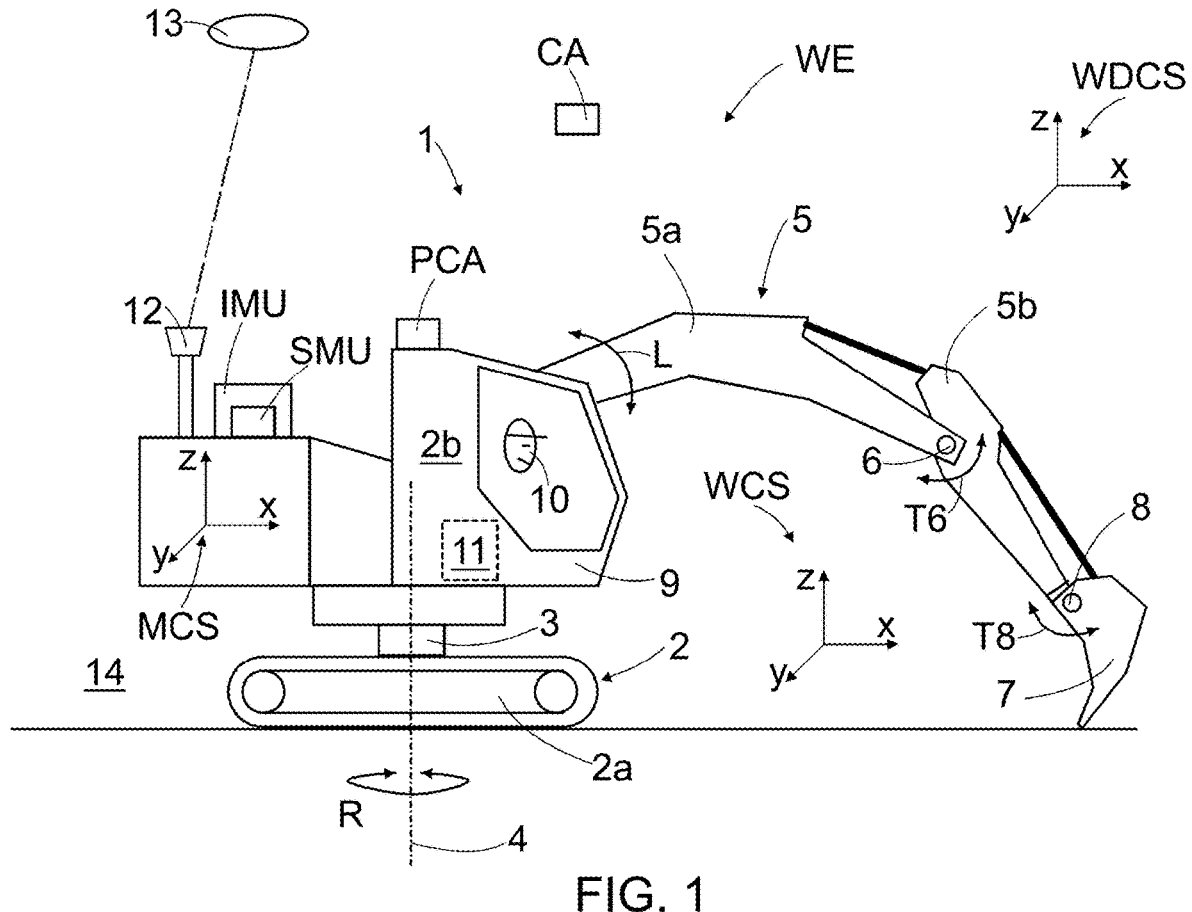
FIG. 1 shows schematically a side view of an excavator in the worksite.

FIG. 1 is a schematic side view of an excavator 1 at a worksite 14 wherein the excavator 1 is intended to be operated. The excavator 1 is one example of an earthworks machine in connection with which the solution disclosed herein for determining a location and orientation of the earthworks machine in the worksite 14 may be applied. The worksite 14 comprises at least one three-dimensional area or space, i.e., a working environment WE, at which the active work to be carried out by the earthworks machine is going to take place. Depending on the nature or character of the worksite 14, the worksite 14 may also comprise, in addition to the area or space at which the active work is going to take place, also one or more surrounding areas or spaces, which may have impact on the operations to be carried out in the area or space at which the active work is going to take place and/or to which areas or spaces it may be affected to by operations taking place at the area or space at which the active work is going to take place. Especially in urban environment the earthworks machine may need to work temporarily also outside the actual or officially determined worksite. Therefore, in this description the worksite 14 may also extend some distance, such as several meters, beyond the area and/or space being the actually or officially indicated worksite 14.

The excavator 1 comprises a movable carriage 2 comprising an under carriage 2a, i.e., a lower carriage 2a, and an upper carriage 2b. The lower carriage 2a comprises caterpillar bands but could alternatively be provided with wheels. The upper carriage 2b is connected to the lower carriage 2a by means of a rotation axle 3 of the upper carriage 2b. The upper carriage 2b may therefore be rotated relative to the lower carriage 2a around a rotation axis 4 as shown schematically with an arrow R. The rotation axis 4 coincides to a centre axis of the rotation axle 3.

The excavator 1 further comprises a boom 5 connected at the upper carriage 2b, whereby the boom 5 is arranged to turn together with the upper carriage 2b. The boom 5 may comprise at least a first boom part 5a. The boom 5 may also comprise further boom parts, such as a second boom part 5b. The boom 5 may be lifted and lowered relative to the upper carriage 2b as shown schematically with an arrow L.

The second boom part 5b may be connected to the first boom part 5a by means of a joint 6, allowing the second boom part 5b to turn about the first boom part 5a as shown schematically with an arrow T6. At a distal end of the second boom part 5b there is a working tool, in this case a bucket 7, and between the bucket 7 and the second boom part 5b there may be a joint 8, allowing the bucket 7 to turn about the second boom part 5b as shown schematically with an arrow T8. In connection with the joint 8 there may also be joints or mechanisms allowing the bucked to be tilted in a sideward direction, for example.

On the carriage 2 there may be a control cabin 9 for an operator 10 of the excavator 1. The control cabin 9 may, for example, be provided with a moving arrangement allowing a vertical position of the control cabin 9 to be adjusted relative to the carriage 2.

The excavator 1 further comprises at least one control unit 11 which is configured to control, in response to received control actions, operations of the excavator 1, such as operations of the carriage 2, the boom 5 and the bucket 7.

The excavator 1 may further comprise a number of satellite receiving devices, such as one or more antennas 12, if the excavator 1 is intended to be able to utilize a kind of a satellite-based positioning system GNSS (Global Navigation Satellite Systems), a very schematically shown satellite being referred to with the reference sign 13. The one or more antennas 12 may be placed for example on the upper carriage 2b.

The excavator 1 may further comprise a number of sensors SMU or groups of sensors SMU such as inertial measurement unit IMU for determining for example position and/or orientation and/or inclination and/or heading of the machine. A sensor or a group of sensors may be at least one of: a gyroscope, an accelerometer, an inclinometer, a magnetic compass, an angle sensor, a position sensor, a pendulum, a spirit level measuring device and any other sensor, such as camera sensor, stereo camera, laser receiver/detector or lidar, suitable for the purpose of determining at least one of position, orientation, inclination or heading of at least one object attached to each other. In the event of the excavator 1 being equipped with the at least one antenna 12 for being able to utilize a satellite-based positioning system GNSS, the at least one sensor may also be a satellite-based compass. The excavator 1 may also be equipped with a sensor for measuring a distance travelled by the excavator 1, which sensor may be internal or external for the inertial measurement unit IMU.

FIG. 1 further discloses schematically number of coordinate systems which may be utilized in the disclosed solution for determining the location and orientation of the excavator 1 in the worksite 14. FIG. 1 discloses a machine coordinate system MCS which is attached to a point in the excavator 1 and allows to determine a location and orientation of an object relative to that point in the machine coordinate system MCS. Further, FIG. 1 discloses a worksite coordinate system WCS which is attached to a point in the worksite 14 and allows to determine a location and orientation of an object relative to that point in the worksite coordinate system WCS. Furthermore, FIG. 1 discloses a world coordinate system WDCS which is attached to a point in a real world and allows to determine a location and orientation of an object relative to that point in the world coordinate system WDCS.

Figure 2A:
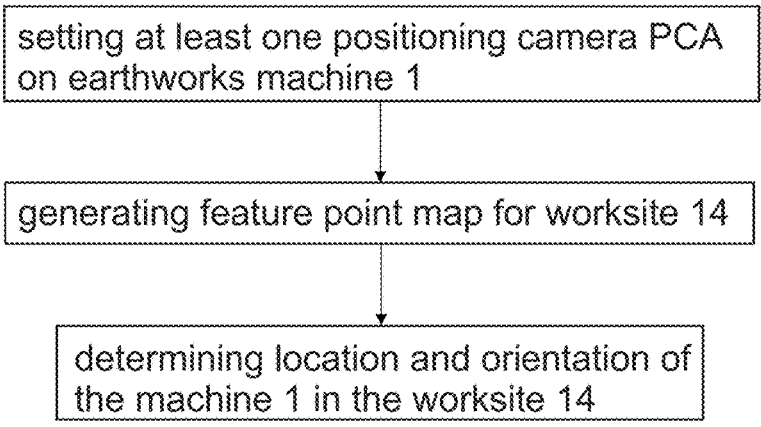
FIG. 2*a* shows schematically an embodiment of a method for determining a location and orientation of an earthworks machine in the worksite.
Figure 2B:
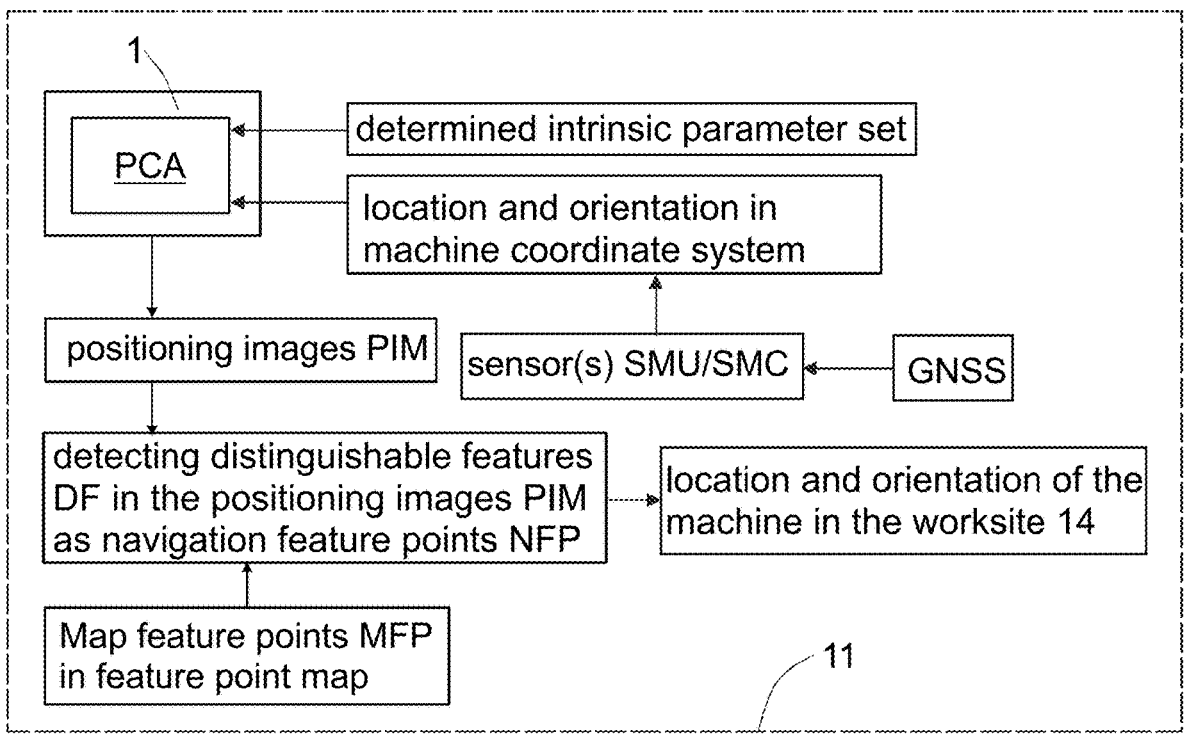
FIG. 2*b* shows schematically a system for determining the location and orientation of the earthworks machine in the worksite.

FIG. 2a shows schematically an embodiment of a method for determining a location and orientation of an earthworks machine in the worksite 14. FIG. 2b shows schematically a system level illustration for determining the location and orientation of the earthworks machine in the worksite 14. The excavator 1 disclosed above is only one example of an earthworks machine wherein the solution disclosed herein may be applied. Other earthworks machines, wherein the solution disclosed herein may also be applied, are for example dozers, wheel loaders, rollers, backhoes, dump trucks, cranes, mobile cranes, forwarders, harvesters and the like. Therefore, in the following description, the earthworks machine may also be referred to with the term "machine 1".

The method for determining the location and orientation of the machine 1 in the worksite 14 comprises setting at least one positioning camera PCA, i.e., one or more positioning cameras PCA, on the machine 1. Each one or more positioning camera PCA has a determined intrinsic parameter set and a determined location and orientation in the machine coordinate system MCS.

The determined intrinsic parameter set defines for images to be taken by the respective positioning camera PCA the formation of each image pixel from a real-world view. The determined intrinsic parameter set comprises parameters defining an operation of the camera. These parameters may include for example an image centre, focal length, skew and lens distortion. The determined intrinsic parameter set describes at which image pixel(s) in the taken image a specific point in the real-world is set. The determined intrinsic parameter set for each positioning camera PCA can be obtained beforehand via laboratory calibrations or afterwards in Structure from Motion procedure that is discussed later in more detail.

The determined location and orientation of the at least one positioning camera PCA in the machine coordinate system MCS must be known in the method. It may be determined at a time of installation of each positioning camera PCA on the machine 1. It may be a combination of manual and sensor measurements or fully measured by sensors. In every case it is important that the location and orientation of each positioning camera PCA with respect to determined origin and axis (x, y, z) of the machine coordinate system MSC will be measured as accurate as possible. Measurements by sensors may be determined for example either with at least one sensor or measuring device external to the machine 1 and utilized only at the time of installation of the positioning camera PCA on the machine 1, or with at least one sensor SMU installed in the machine 1 and/or with at least one sensor SMC installed in the positioning camera PCA. The at least one sensor SMC, i.e., one or more sensors SMC, in the positioning camera PCA as well as the at least one sensor SMU, i.e., one or more sensors SMU installed on the machine 1 may be used for determining for example position and/or orientation and/or inclination and/or heading of the positioning camera PCA. Regardless of the way how the location and orientation of the camera in the machine coordinate system MCS is measured, the system for determining the location and orientation of the earthworks machine in the worksite needs the exact location and orientation of each of the at least one positioning camera PCA in the machine coordinate system MCS. The location and orientation of the positioning camera PCA in the machine coordinate system MCS may also be determined or verified during operation of the machine 1 by using at least one sensor SMU in the machine 1 and/or at least one sensor SMC in the positioning camera PCA to make sure the location and/or orientation of the at least one positioning camera PCA remains as determined to the system or if not, it may be redetermined to the system when altered. As well, the operator of the machine may be informed if location or orientation of a positioning camera PCA has changed. The at least one sensor SMC in the positioning camera PCA may for example be at least one of: a gyroscope, an accelerometer, an inclinometer, a magnetic compass, an angle sensor, a position sensor, a pendulum, a spirit level measuring device, or any other sensor or measuring device appropriate for measuring location and/or orientation or change in location and/or orientation.

The method for determining the location and orientation of the machine 1 in the worksite 14 further comprises creating or generating a feature point map, i.e., a navigation map, that forms a representation of map feature points in the worksite 14 that will be used for determining the location and orientation of the machine 1 operating in the worksite 14. This navigation map is thus a pre-created feature point map about the worksite 14 to be used afterwards for a real time navigation of the machine 1 in the worksite 14. Some alternative solutions for creating the feature point map are discussed in more detail later in this description.

The location and orientation of the machine 1 in the worksite 14 is determined based at least on information available in the feature point map and the determined intrinsic parameter set and the determined location and orientation of each corresponding positioning camera PCA in the machine coordinate system MCS. This step for determining the location and orientation of the machine 1 in the worksite 14 is discussed in more detail later in connection with FIGS. 7a, 7b and 7c and the related description, in view of FIGS. 2a and 2b.

The necessary data processing for carrying out the determination of the location and orientation of the machine 1 in the worksite 14 may be carried out by data processing resources available solely in the machine 1, like the control unit 11, by data processing resources available solely outside the machine 1, such as a data processing resources reserved for a worksite information management system, such as a worksite server or computer, or in a cloud service arranged to provide the worksite information management system, or by data processing resources available both in the machine 1 and outside the machine 1. Similarly, the feature point map to be used for determining the location and orientation of the machine 1 in the worksite 14 may be located in at least one of the machine 1, the worksite information management system, or the cloud service. The necessary data transmission may be implemented by private and/or public data transmission networks available for the worksite 14. In FIG. 2b, the control unit 11, which could be replaced by the worksite information management system or by the cloud service, is denoted in FIG. 2b very schematically by a box drawn with a broken line and surrounding the items in the system of FIG. 2b.

Figure 3:
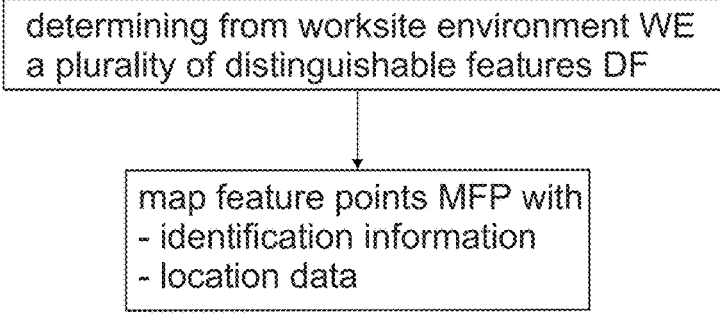
FIG. 3 shows schematically an illustration of a method and system for providing a feature point map for the worksite.

Referring back to the creation or generation of the feature point map already discussed shortly above, FIG. 3 shows very schematically a method for providing feature point maps for the worksite 14. The embodiment of the method comprises determining from the worksite environment WE a plurality of distinguishable features as a plurality of map feature points MFP, wherein the plurality of the map feature points MFP each have at least identification information and location data. The identification information comprises at least a unique identifier for the respective map feature point MFP, whereas the location data comprises at least one of: three-dimensional location of the respective map feature point MFP in the worksite coordinate system WCS or two-dimensional image coordinates with image identifier. The unique identifier may comprise at least some kind of index number for the database and at least one feature descriptor. The feature descriptors identify map feature points MFP from each other and are thus able to specify each distinguishable feature from each other. Typically map feature points MFP have as the unique identifier a feature descriptor, an ARUCO code or index number for a checker marker. In other words, in the creation of the feature point map a plurality of images is taken by at least one camera from the worksite environment WE and these images are then examined or analysed for finding in these images distinguishable features DF which are considered to be appropriate to provide the map feature points MFP from the worksite environment WE for forming the feature point map, i.e., the pre-created navigation map to be used afterwards for the real time navigation of the machine 1 in the worksite 14.

Some various solutions for determining the map feature points MFP for forming the feature point map are considered later in more detail. Before that some technical aspects relating to finding of the distinguishable features DF in the images taken from the worksite environment WE, and to analysing thereof, is considered.

For the creation of the feature point map, i.e., the navigation map, a plurality of images is taken from the worksite environment WE at different positions of a camera/cameras that takes/take the images. The at least one camera herein may be the at least one positioning camera PCA applied in some machine 1, or some other camera CA applied in the worksite 14, for example a camera applied in a drone moving in the worksite 14. This procedure of taking the images from the worksite 14 reminds an aerial imaging or aerial image photographing allowing a three-dimensional scene reconstruction of the worksite environment WE. A perspective of images taken is, however, preferably substantially the same as a perspective of the at least one positioning camera PCA to be applied in the machine 1 will be when the determination of the location and orientation of the machine 1 in the worksite 14 is carried out. The images are taken with an amount of overlap to combine or bind the images together to form a number of groups of images, or at least one group of images GIM. It should be noted that each image must overlap much enough with at least one other image in a group of images GIM but not with all other images in the group of images GIM. The overlap of the images may vary case-by-case basis, being for example between 40% and 80%. If the area imaged contains lots of solid items that remain unchanged, such as a building having plenty of features the overlap may be smaller. On the other hand, if the area imaged contains lots of moving or changeable items such as crushed rock, young trees, bushes or lawn, or even smooth white wall, the overlap should be much greater. The more overlaps, the more likely is that the images will be successfully bound, and the denser feature point map may be created.

Image data of each of the images taken may be augmented with attitude data and/or GNSS position data for each image if there is the inertial measurement unit IMU and/or GNSS available. These can be utilized in the creation of the feature point map during the Structure From Motion workflow, which is a generally known technique for the three-dimensional scene reconstruction and contains as main elements the feature search from images, matching of the features from and to each image, motion recovery and triangulation using intrinsic parameters of camera and, optionally, finding optimal model parameters for the scene reconstruction through an optimization task called Bundle Adjustment.

The Bundle Adjustment is the optimization task, wherein parameters needed for the three-dimensional scene reconstruction is solved. These can be exterior/extrinsic parameters, such as a rotation and a translation of an image relative to other images, three-dimensional coordinates of common feature points in the images and camera's intrinsic parameters. Camera's extrinsic parameters may also be for example the location and attitude of the camera in the world WDCS or worksite WCS coordinate system. A mathematical model forming a part of the Bundle Adjustment may therefore be different based on the number of parameters applied in the model. It is thus a design choice that defines what is to be solved. Also, every parameter in the model to be solved or optimized may be assigned with a preliminary initial value appointed with an initial value, whereas some of the parameters in the model may have a fixed value known in advance. The purpose of the Bundle Adjustment is to optimize all model parameters selected to be optimized, such as the exterior image parameters relating to information of features presented in the taken images. The Bundle Adjustment is not needed if the intrinsic and extrinsic camera parameters discussed above are already known. As it may be the case that it is not necessarily meaningful to include all matched detected feature points DFP in the Bundle Adjustment optimization. The discarded detected feature points DFP may be reconstructed in the final triangulation after Bundle Adjustment. Thus, these detected feature points DFP may be utilized when navigating with PnP based method. Also, as image extrinsic parameters are solved within Bundle Adjustment, even detected feature points not matched DFP-NM residing on the images can be utilized when determining the location and orientation of the machine in real-time in an embodiment like discussed later and therefore may be stored with the MFP without three-dimensional coordinates. It should be noted that when talking about position and/or orientation/attitude, intrinsic parameters of an image, extrinsic parameter of an image, or parameters of an image, these are like parameters of the camera at time of taking the image. Thus, for example if the intrinsic and the extrinsic parameters of the camera were known in time an image was taken, these parameters may be used as intrinsic and extrinsic parameters of the image taken by the camera, and if the intrinsic and extrinsic parameters of the camera were not known in time of taking the image, they will be solved in Bundle Adjustment and as well will be discussed as intrinsic and extrinsic parameters of the image. Alternatively, if only the intrinsic camera parameters are known, they may also be fed into the Bundle Adjustment as known information. As indicated above, the Bundle Adjustment procedure is a generally known technique in connection with the three-dimensional scene reconstruction but, for example, the publication Bundle Adjustment—A Modern Synthesis, Vision Algorithms: Theory &Practice, B. Triggs, A. Zisserman & R. Szeliski (Eds.), Springer-Verlag LNCS 1883, 2000, discloses the Bundle Adjustment procedure in more detail.

Typically, there is no available for the images attitude and/or GNSS position data when images are taken from the worksite environment. For example, GNSS may not be available in tunnels, under bridges or in urban environment having tall buildings or the camera CA, PCA taking the images is not connected to a positioning system that would determine location and/or orientation of the camera CA, PCA. In that case ground control point network may be applied. The ground control points are reference points, or reference feature points, spread, preferably evenly, across the worksite 14. Because these reference points are needed to be recognized from the images, they are equipped with specific markers for allowing the recognition thereof. The ground control points may for example be 4-square checker markers or Aruco markers, the first mentioned typically being more accurate to detect from an image. If the checker markers are to be used, the markers need not necessarily be unique, i.e., they all may be identical, whereby the location of each marker specifies the respective marker. The checker markers can be detected in the images, but the actual identification thereof is done with for example a computer readable number on the marker, by context-based recognition, i.e., what are the surrounding objects that are visible in the image, or afterwards in the three-dimensional scene using markers' distance and angle combinatorics between points in both the worksite coordinate system and the three-dimensional coordinate system of the reconstruction of the group of images.

The GNSS position data with possible attitude data for each image, or alternatively, the ground control point network is applied to create the feature point map, i.e., the navigation map such that it brings the worksite environment scene into the worksite coordinate system WCS with right scale. Alternatively, the attitude data and GNSS position data for each image may be applied together with the ground control point network for the feature map creation to bring the worksite environment scene into the worksite coordinate system WCS with right scale. When applying the Bundle Adjustment, coordinate transformation from the reconstructed three-dimensional worksite environment scene to the world WDCS or worksite WCS coordinate system may be solved in a separate optimization task after the Bundle Adjustment. Covariance matrices depicting an accuracy information for the detected features may also be solved in the Bundle Adjustment procedure.

To reconstruct the three-dimensional scene from the taken worksite environment images same feature points from the multiple images need to be found. The three-dimensional coordinates for these common feature points can then be calculated. The more common feature points found in the taken images, the more certain is the high accuracy of the reconstruction.

Figure 4:
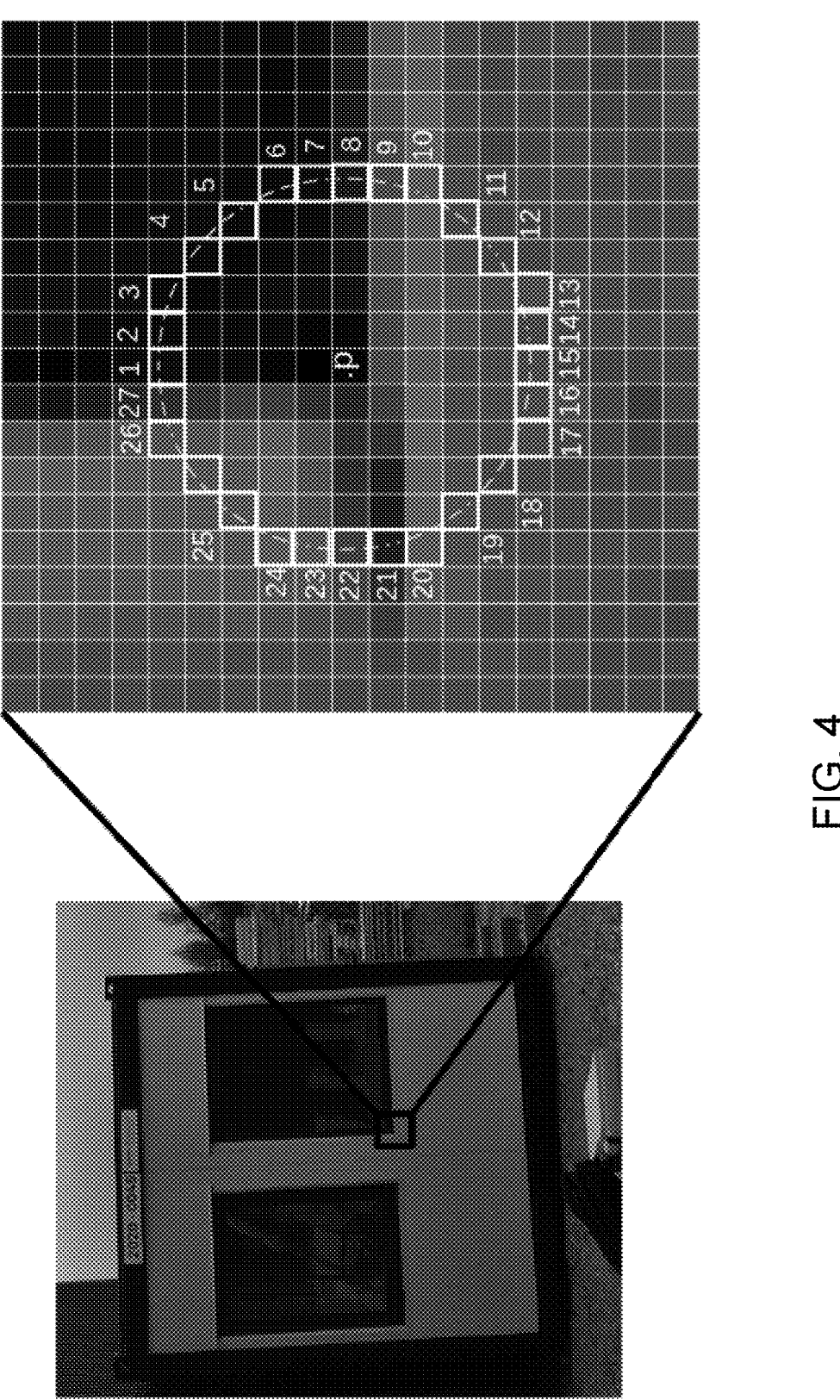
FIG. 4 shows schematically an example of creating a feature descriptor for a single pixel point in an image.

In the taken images the feature(s) in the three-dimensional worksite environment WE are depicted onto two-dimensional plane, the two-dimensional location of the feature(s) in the images being determined by two-dimensional image coordinates, i.e., image pixel coordinates. Finding the same feature from several images may be implemented totally automatic and there is no need to pick common object points in the images manually, although that is not excluded herein. SIFT (Scale-Invariant Feature Transform), SURF (Speeded-Up Robust Features) and ORB (Oriented FAST and Rotated BRIEF) are some examples of these feature detection algorithms. All of those create a respective feature descriptor for a single pixel point in the image by utilizing pixel values or pixel textures around that point. The feature descriptor determines or defines characteristics of the detected feature. A principal example of creating the feature descriptor for the single pixel point in the image by utilizing pixel values around that point is shown in FIG. 4, wherein it is shown that the feature descriptor for the pixel point p will be created by pixel values or textures of twentyseven pixels remaining around the pixel point p.

The use of ORB-based feature descriptors is advantageous in the determination of the location and orientation of the moving machine 1, because matching ORB-based feature descriptors is substantially robust to changes in imaging conditions, such as illumination conditions, blur, rotation, and scale, and it is sufficiently fast to compute for real time applications.

Same features appearing in different images can be matched by comparing their feature descriptors. According to an embodiment, the feature matching procedure may be implemented with a generally known brute-force search based problem-solving technique and algorithmic paradigm that consists of systematically enumerating all possible candidates for a solution and checking whether each candidate satisfies the problem's statement.

The procedure relating to matching features appearing in different images in the solution disclosed herein, may thereby, comprise comparing all features' descriptors and select the best matches to correspond to the same features in the different images. Additionally, a forward-backward consistency check may be made, wherein, for example, it is verified if an $i^{th}$ feature descriptor in a first image has a $j^{th}$ feature descriptor in a second image as the best match and vice-versa. Finally, only those matches with small enough feature descriptor distance, that being an abstract distance defined for the feature descriptor, are accepted to represent the same features in the different images.

After obtaining the three-dimensional location coordinates for the features in the world WDCS or worksite WCS coordinate system and their respective two-dimensional image coordinates in the images where the features are visible, together with the attitudes and positions for every image, as well as the features' descriptors, the features' descriptors and their three-dimensional coordinates may be linked together for generating the feature point map, i.e., the navigation map. In the feature point map, it is preferable to index each feature uniquely. In the feature point map for the solution disclosed herein, for example following information may be stored for each feature forming a map feature point MFP:

feature index (index number starting from 0 or 1, for example), feature descriptor (such as the ORB descriptor or ARUCO code), three-dimensional worksite WCS or world WDCS coordinate system coordinates, possibly including an ellipsoid indicating uncertainty of accuracy of the determined coordinates, image identifier identifying those images where the same feature is visible (there is at least one and typically at least two images where the same feature is visible), image coordinates for the location of the feature for those images where the feature is visible, possibly including an ellipse indicating uncertainty of accuracy of the image coordinates, position and attitude of each image in world WDCS or worksite WCS coordinate system, covariance matrices, i.e., accuracy information, for the feature, static rating for the feature, semantic classification information comprising manmade or natural object classification describing the location of the feature, i.e., the balcony, construction booth, manhole, thick tree, crushed rock.

view directions where the feature is viewable, such as omnidirectional, North, North-East-West, directions in degrees, or ground areas of the worksite, i.e., Southern parking area.

Figure 5B:
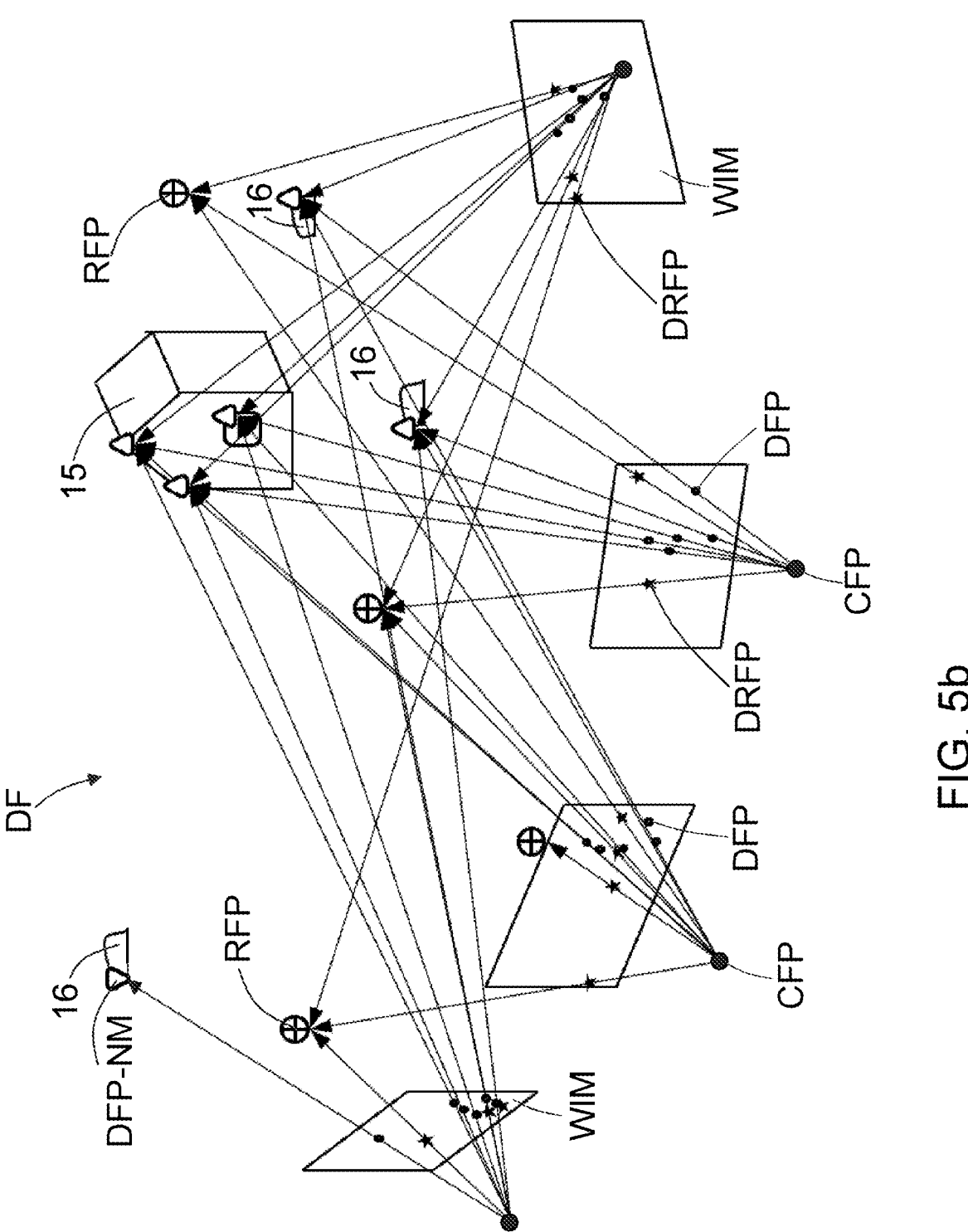
Figure 5C:
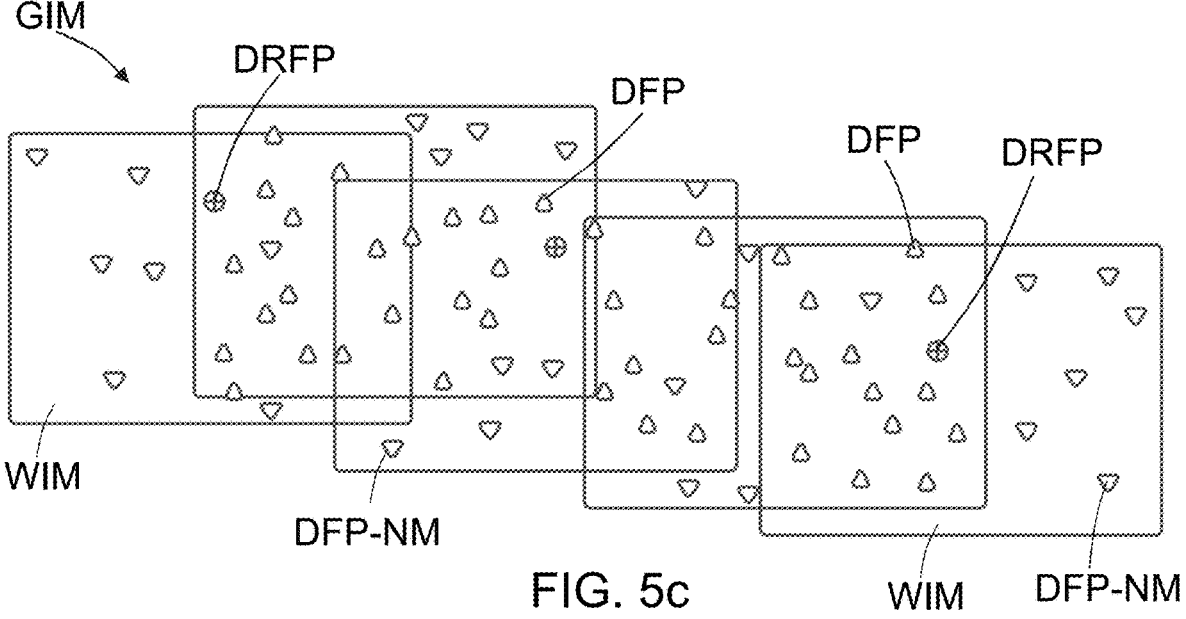

A First Embodiment to Provide Map Feature Points to Create a Feature Point Map FIGS. 5a, 5b and 5c show schematically an embodiment for determining a plurality of map feature points MFP for creating of the feature point map, i.e., a first embodiment for determining from a worksite environment WE a plurality of distinguishable features DF as a plurality of map feature points MFP, wherein the plurality of the map feature points MFP has at least identification information and location data, wherein the identification information comprises at least one unique identifier like feature descriptor for the map feature point MFP to identify it from an image and the location data comprises at least one of: three-dimensional location of the map feature point MFP in the worksite 14, i.e. in the worksite coordinate system WCS or two-dimensional image coordinates with image identifier, i.e. the information which are the at least one images wherefrom the map feature point MFP is found and from which image pixel location(s). In this embodiment the map feature points MFP for the feature point map are determined by utilizing reference feature points RFP having been preset in the worksite 14.

The embodiment of FIGS. 5a, 5b and 5c comprises a step of taking a plurality of two-dimensional worksite environment images WIM by at least one camera CA, PCA, wherein the at least one camera CA, PCA has determined intrinsic parameter set. FIG. 5b shows schematically four successive worksite environment images WIM taken from the worksite environment WE. The worksite environment images WIM are preferably taken such that there is a significant overlap, for example the overlap of 40% to 80% between the successive images WIM. For the sake of clarity, in FIG. 5b the successive images WIM have been shown separately from each other. The leftmost image WIM may be considered to be the first worksite environment image WIM taken and the rightmost image WIM may be considered to be the last worksite environment image WIM taken.

The taking of the images WIM may be carried out by at least one positioning camera PCA attached in some machine 1 moving around the worksite 14 and/or by at least some other camera CA not being a positioning camera PCA attached to any machine 1. The at least one other camera CA may for example be attached to a drone arranged to move in the worksite environment WE. The one other camera CA is shown very schematically in FIG. 1. A focal point of the camera CA, PCA is illustrated in FIG. 5b schematically with the black dot denoted with the reference sign CFP.

The step of taking the plurality of the two-dimensional worksite environment images WIM is followed by a step of detecting from each of the plurality of the two-dimensional worksite environment images WIM at least one of:

a) distinguishable features DF for associating each distinguishable feature DF with identification information and image coordinates of the respective two-dimensional worksite environment image WIM as detected feature points DFP; or b) reference feature points RFP, wherein the reference feature points RFP are preset in the worksite 14 and associated with identification information and location data, for additionally associating each reference feature points RFP with image coordinates of the respective two-dimensional worksite environment image WIM as detected reference feature points DRFP.

Thus, the detecting of the distinguishable features DF from each one of the plurality of images may include only one of the options a) and b), or both options a) and b). For example, from some images it may be found only option a) features, some images only option b) features and some images both option a) and option b) features.

The acquired two-dimensional worksite environment images WIM may thus comprise two kinds of distinguishable features, the first features being to be determined as the detected feature points DFP, and the second features being the reference feature points RFP to be determined as the detected reference feature points DRFP.

Considering firstly the reference feature points RFP, i.e., the option b) above, the reference feature points RFP are reference points that have been preset in the worksite 14. These may for example be the markers discussed above. In FIG. 5b these reference feature points RFP correspond to the graphical symbols comprising the circle surrounding the cross. The lines of sights from the camera focal point CFP to the reference feature points RFP are shown schematically with the respective arrows. In the worksite environment images WIM the reference feature points RFP are set at locations shown by the graphical symbols of asterisk.

When the reference feature points RFP are associated with their identification information and location data in the three-dimensional world WDCS or worksite WCS coordinate system coordinates, as well with their respective image coordinates in the respective two-dimensional worksite environment images WIM, the reference feature point RFP may be determined to be a detected reference feature point DRFP. Consequently, the graphical symbols of asterisks in FIG. 5b may be denoted as the detected reference feature points DRFP and the image coordinates refer to the image pixel coordinates of the asterisks related to the respective detected reference feature points DRFP in the respective worksite environment images WIM.

Considering secondly the distinguishable features DF to be determined as the detected feature points DFP, FIG. 5b discloses a building 15 having been associated with three triangles with tips pointing upwards and two stones 16 having been associated with triangles with tips pointing upwards and one stone 16 having been associated with a triangle with tip pointing downwards. The triangles depict in FIG. 5b distinguishable features DF that are detected in the worksite environment images WIM and differ from the preset reference feature points RFP discussed above. Triangle pointing downwards describes a distinguishable feature DF that cannot or will not be matched as the same in two or more images, as it is discussed in more detail below. In FIG. 5b it is shown that the triangles are associated with objects considered to be immovable in the worksite 14, these kinds of objects being preferable in view of creating of the feature point map for the navigation of the machine 1. Considering an object being immovable or movable in the worksite 14 may be done using semantic image segmentation, which is known in the art. For some point it may be also done manually as well for example by selecting all the distinguishable features detected from a car that soon leaves the worksite 14 and determining them residing on a movable object. The lines of sights from the camera focal point CFP to the detected triangles are shown schematically with the respective arrows. In the worksite environment images WIM these triangles are set at locations shown by the graphical symbols of small black circles.

When the distinguishable features DF denoted by the triangles are associated with their identification information and their image coordinates in the respective two-dimensional worksite environment images WIM, they are determined to be detected feature points DFP. Consequently, the graphical symbols of the small black circles in FIG. 5b may be denoted as the detected feature points DFP and the image coordinates refer to the image pixel coordinates of the small black circles related to the respective detected feature points DFP in the respective worksite environment images WIM.

It is noted herein that the procedure of detecting the distinguishable features DF and the determination of the detected feature points DFP and the detected reference feature points DRFP is carried out as long as new worksite environment images WIM are taken but not necessarily in real-time. It is also noted herein that it may be possible that some reference feature points RFP may at first become detected erroneously as the detected feature points DFP but may later become interpreted correctly as the detected reference feature points DRFP.

When acquiring the worksite environment images WIM and detecting distinguishable features DF therein, it is also created at least one group of images GIM from the worksite environment images WIM by binding the worksite environment images WIM having at least one of:

detected feature points DFP, or detected reference feature points DRFP matched as the same detected feature points DFP or same detected reference feature points DRFP in the different worksite environment images WIM.

When creating at least one group of images GIM from the worksite environment images WIM, it is created, based on specific conditions discussed below, at least one group of images GIM, i.e., at least one image collage, from the worksite environment images WIM. In the group of images GIM at a minimum at least two different worksite environment images WIM taken from different camera locations are grouped into the same group, i.e., a group of images GIM, based on the detected feature points DFP and/or the detected reference feature points DFRP matched as the same points in these different worksite environment images WIM. At its minimum at least two worksite environment images WIM may be bound into an acceptable group of images GIM based on the condition that in each of these worksite environment images WIM to be selected into this group of images GIM there is at least five detected feature points DFP or detected reference feature points DRFP matched as the same points in between each single worksite environment image WIM and one single other image in the rest of the group of images and the whole acceptable group of images contains at least three detected reference feature points DRFP matched as the same points in all the worksite environment images WIM of the acceptable group of images GIM. To be more specific, when binding next image to the group of images there must be at least five points (either detected feature points DFP or detected reference feature points DRFP or some kind of mix of the previous such as four DFPs and one DRFP) that bind the next image to the group of images and these points should reside in one single image that is already in the group of images. Thus, these five points need not be in every other image of the group of images. One image having five binding points is sufficient and more than one is also acceptable but not necessary, as said previously.

For example, the group of images might contain 100 images, which images are taken from all around a building. Each of these images may contain five points binding the image to the previous image (except the first image) and the subsequent image (except the last image, although the last image could be bound to the first image. Another example could be such that there are four images in a group of images GIM, wherein the second image is bound by five points to the first image, third image is bound by five points to the first image, and the fourth image is bound by five points to the third image and five points to the second image. Thus, the fourth image is bound by five points (either detected feature points DFP or detected reference feature points DRFP or a combination of the previous) to two images in the group of images that has already been bound before binding of the fourth image.

When creating a group of images as stated above, no information external to the worksite environment images WIM is needed to make the decision to bind the respective worksite environment images WIM to form a group of images GIM. However, if there is information available regarding where each of the images are taken, such as location and orientation of the camera when these images are taken, it may be used to speed up binding these images, because this information may tell that some images does not have even theoretical possibility to have even a single matching point, for example if the images are taken from the same location and to opposite directions.

Referring to FIG. 5b this means that at minimum an acceptable group of images may be formed using: three leftmost images or the rightmost image with a second image from the left. The best group of images would contain all the four worksite embodiment images of FIG. 5b.

FIG. 5c shows schematically one group of images GIM, formed of five different worksite environment images WIM which may or may not be successive images WIM taken by the at least one camera CA, PCA. However, by knowing the order of images one could speed up grouping the images. In FIG. 5c, differing a little bit from FIG. 5b for the sake of clarity, the triangles having the tip upwards are now straightforwardly denoted to be the detected feature points DFP matched as the same in at least two worksite environment images WIM and the circles surrounding the cross are now straightforwardly denoted to be the detected reference feature points DRFP matched as the same in at least two worksite environment images WIM. FIG. 5c further comprises triangles having the tip downwards, these triangles denoting distinguishable features DF detected in the worksite environment images WIM but not being identified, i.e., matched as the same points in two or more worksite environment images WIM.

In the example of FIG. 5c each single worksite environment image WIM happen to include at least one detected reference feature point DRFP. The situation could be as well such that one, two, or even three of the images, does not include a single detected reference feature point DRFP. The five different worksite environment images WIM in the example of FIG. 5c have been bound to each other, i.e., connected to each other, with overlaps in at least one direction in the plane of paper, to form a group of worksite environment images GIM. This group would be acceptable, since there is at least three reference feature points RFP matched as the same points in at least two images and each image is bound to some other image with at least five at least one of: detected reference feature point DRFP or detected feature points DFP matched as the same points. It should be noted that if any one of these images were missing the group could not form an acceptable group of images since all of these images are needed to bind the images together and to have the at least three reference feature points RFP matched as the same points in at least two images.

Each group like that, i.e., each group of images GIM containing at least three detected reference feature points DRFP matched as the same and binding each image with at least one other image of the group by at least five points matched as the same, is accepted for further analysis for determining the map feature points for the feature point map. If the condition is not fulfilled, the group of the images GIM is rejected from further analysis. There would still be a chance to avoid the rejection by determining the three-dimensional location of sufficient amount of detected feature points DFP matched as the same points, or any other such points from images that points are both detectable from at least two images and which points three-dimensional coordinates are determinable to become detected reference feature points DRFP, to fulfil the minimum amount of at least three detected reference feature points DRFP matched as the same. This kind of operation could save time since one need not take another set of images with the markers visible. The number of images might in some cases be much higher than five.

Referring back to the example of FIG. 5b, as already stated above, the second worksite environment image WIM from the left and the rightmost worksite environment image WIM could form an acceptable group of two images, because both of the images refer to the same three detected reference feature points DRFP, thus containing in the group of images at least three detected reference feature points DRFP matched as the same and because both of the images in addition refer to at least two detected feature points DFP matched as the same, thus fulfilling the total amount of five DFP/DRFP points matched as the same. In this case there are three different detected reference feature points DRFP common to these two images. Similarly, for example, the three leftmost or the three rightmost images may together form respective two acceptable groups of images. However, for example, the two rightmost images are not capable to form the acceptable group of images without any other image although they have additional five detected feature points DFP matched as the same points, because the two rightmost images have only two same detected reference feature points DRFP where they refer to, thereby not fulfilling the condition containing in the group of images at least three detected reference feature points DRFP matched as the same.

In the further analysis procedure, for each accepted group of images GIM a location and orientation of the group of images GIM and an identification information and location data for the detected feature points DFP matched as the same points is determined by utilizing the identification information and location data of the at least three detected reference feature points DRFP matched as the same points contained in the accepted group of the images GIM, wherein at least one of:

the detected feature points DFP matched as the same points with determined identification information and location data, or the detected reference feature points DFRP matched as the same points and associated with identification information and location data are determined as a plurality of map feature points MFP. In this procedure the three-dimensional location of the detected feature points DFP of respective group of images GIM is determined in the worksite coordinate system WCS by using the three-dimensional location of each of the at least three detected reference feature points matched as the same points.

Figure 5D:
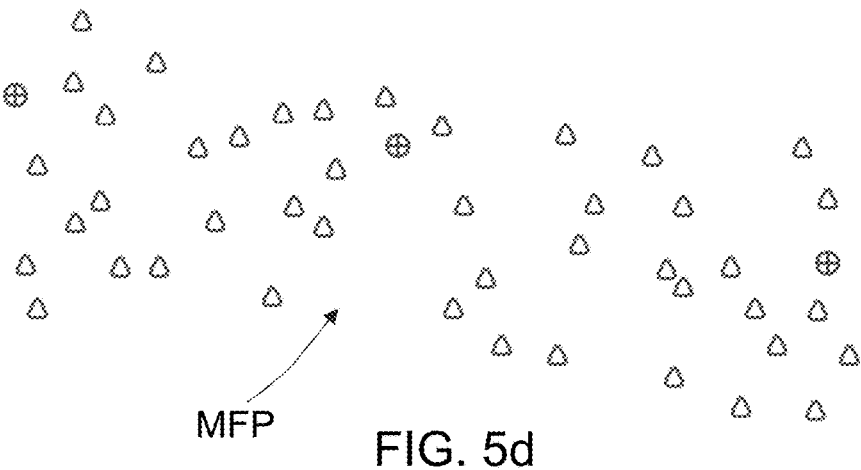

In other words, only those detected feature points DFP and detected reference feature points DRFP in the accepted group of images GIM may be selected to be map feature points MFP for the navigation map, which detected feature points DFP and detected reference feature points DRFP are matched to be the same points based on their determined identification information that have been determined in the step of detecting from each of the plurality of the two-dimensional worksite environment images WIM distinguishable features DF. FIG. 5d shows schematically an example of the accepted map feature points MFP selected accordingly among the detected feature points DFP and the detected reference feature points DRFP shown in FIG. 5c.

According to an embodiment in connection with the determination of the map feature points MFP disclosed herein, the step of determining for each accepted group of images GIM the location and orientation of the group of images GIM and the identification information and location data for the detected feature points DFP matched as the same further comprises determining a static rating for the detected feature points DFP matched as the same by utilizing the identification information and location data of the at least three detected reference feature points DFRP contained in the accepted group of images, wherein at least one of:

the detected feature points DFP matched as the same with determined identification information, location data and the static rating, or the detected reference feature points DRFP associated with identification information and location data are determined as a plurality of the map feature points MFP.

The static rating provides a measure about an accuracy of the location of the detected feature points DFP to be applied as the map feature points MFP. This accuracy information is determined by utilizing the identification information and location data of the at least three detected reference feature point DRFP. Regarding the accuracy of each detected feature point DFP, for example the distance of the detected feature point DFP from the camera in time of the images were taken may affect a lot, for example in such a way that the farther the detected feature point DFP from the camera, the less accurate the information retrieved may be. Most of the information relating to the static rating of detected feature points DFP is determined during the Bundle Adjustment discussed above and is represented by a corresponding covariance matrix for the three-dimensional location of the respective detected feature point DFP. Thus, the static rating may be an ellipsoid indicating uncertainty of accuracy of the determined three-dimensional coordinates.

The static rating for the detected reference feature points DFRP is considered to 100% or very close to it because their location data is known beforehand because of the detected reference feature points DFRP corresponding preset markers in the worksite 14. At its best the static rating for the detected feature points DFP may get on for 100% with very accurate calculation during the Bundle Adjustment but typically the accuracy for the detected feature points DFP is somewhat less than that.

Considering an object being immovable or movable in the worksite 14 may be done using semantic image segmentation and will influence on determined static rating for detected feature point DFP on the object. For some point semantic image segmentation may be also done manually as well for example by selecting all the distinguishable features, or detected feature points DFP, detected from a car that soon leaves the worksite 14 and determining them residing on a movable object, which will eventually deem the static rating for those points the lowest and thus being not selected as map feature points MFP. Although, these points may be used when binding the images to a group of images GIM. In this case one should bear in mind that, when the car has left, in this area there would be short of map feature points MFP. Discussion relating to ratings may be found later in this description.

Figure 6:
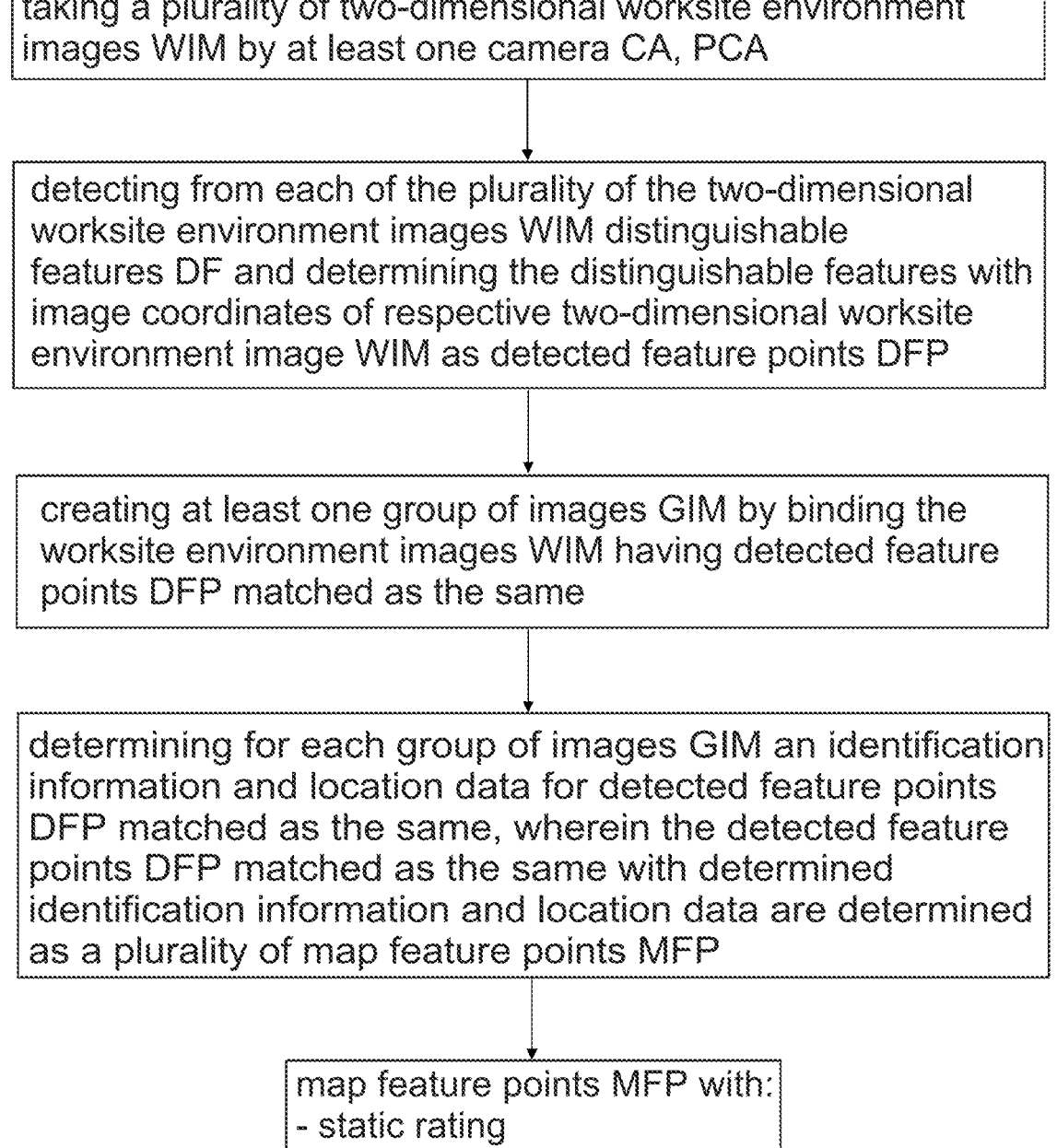
FIG. 6 shows schematically another embodiment for determining map feature points for creating of a feature point map.

A Second Embodiment to Provide Map Feature Points to Create a Feature Point Map:

FIG. 6 shows schematically a second embodiment for determining a plurality of map feature points MFP for creating the feature point map, i.e., a second embodiment for determining from a worksite environment WE a plurality of distinguishable features DF as a plurality of map feature points MFP, wherein the plurality of the map feature points MFP has at least identification information and location data, wherein the identification information comprises at least one unique identifier like feature descriptor for the map feature point MFP to identify it from an image and the location data comprises at least one of: the three-dimensional location of the map feature point MFP in the worksite 14 or the two-dimensional image coordinates with the image identifier. In this embodiment the tree-dimensional location of map feature points MFP for the feature point map are determined by utilizing satellite-based positioning system GNSS with possible at least one sensor applied with the camera CA, PCA for determining position of the camera. If the orientation information of the camera CA, PCA is known it may be used with the position/location information.

This embodiment comprises a step of taking a plurality of two-dimensional worksite environment images WIM by at least one camera CA, PCA, wherein the at least one camera CA, PCA has determined intrinsic parameter set and determined location and possibly determined orientation in the worksite coordinate system WCS. As discussed earlier, the worksite environment images WIM are preferable taken such that there is a significant overlap, for example the overlap of 40% to 80% between the successive images WIM. The worksite environment images WIM taken may be like those shown in FIG. 5b, however, with the difference that possible preset reference feature points RFP in the worksite 14 and visible in the taken worksite environment image WIM may be considered as a similar distinguishable feature as the points relating to the detected feature points DFP in FIG. 5b. In other words, in this embodiment the reference feature points RFP are not needed as reference feature points having pre-determined three-dimensional location but may be used if desired.

The acquisition of the images WIM may be carried out by at least one positioning camera PCA attached in some machine 1 moving around the worksite 14 and/or by at least some other camera CA not being a positioning camera PCA having been attached to any machine 1. Also, herein, the at least one other camera CA may for example be attached to a drone arranged to move in the worksite environment WE, as long as at least location of the camera CA may be determined regarding each image WIM. Orientation information of the camera CA may also be used, if determined.

The step of taking the plurality of the two-dimensional worksite environment images WIM is followed by a step of detecting from each of the plurality of the two-dimensional worksite environment images WIM distinguishable features DF and determining the distinguishable features DF with image coordinates of respective two-dimensional worksite environment image WIM as detected feature points DFP.

Thus, herein, the acquired two-dimensional worksite environment images WIM comprise only one kind of distinguishable features, i.e., features that are considered to correspond the detected feature points DFP described in FIGS. 5b and 5c with the triangles having the tips pointing upwards or downwards. And, as said above, possible preset reference feature points RFP in the worksite 14 being visible in the worksite environment image WIM are also considered, if detected, as the detected feature points DFP, and again the location information from them is not needed but may be used if desired. Thus, the disclosure in FIGS. 5b and 5c is applicable herein if the graphical symbols relating to the reference feature points RFP and the detected reference feature points DRFP therein are either omitted or considered to be replaced by the graphical symbols of the triangles relating to the detected feature points DFP. When the distinguishable features DF denoted with the triangles are associated with their image coordinates, i.e., their image pixel coordinates, in the respective two-dimensional worksite environment images WIM, these are determined to be the detected feature points DFP.

It is noted herein that the procedure of detecting the distinguishable features DF and the detected feature points DFP is carried out as long as new worksite environment images WIM are acquired but not necessarily in real-time.

When acquiring the worksite environment images WIM and detecting distinguishable features DF therein, it is also created at least one group of images GIM from the worksite environment images WIM by binding the worksite environment images WIM having the detected feature points DFP matched as the same in the different worksite environment images WIM. The procedure herein for creating the at least one group of images is like that disclosed above, however, with the difference that only the detected feature points DFP are considered herein.

Furthermore, for determining the map feature points MFP for the feature point map of the worksite 14, it is determined for each group of images GIM an identification information and location data for the detected feature points DFP matched as the same by utilizing the location and orientation in the worksite coordinate system WCS of the at least one camera CA, PCA with each respective two-dimensional worksite environment image WIM, wherein the detected feature points DFP matched as the same with determined identification information and location data are determined as a plurality of map feature points MFP.

In other words, only those detected feature points DFP in the group of images GIM will be selected to be the map feature points MFP for the feature point map, which detected feature points DFP are matched to be the same points based on their determined identification information that have been determined in the step of detecting from each of the plurality of the two-dimensional worksite environment images WIM distinguishable features DF.

According to an embodiment in connection with the determination of the map feature points MFP disclosed herein, the step of determining for each group of images GIM an identification information and location data for detected feature points DFP matched as the same further comprises determining static rating for the detected feature points DFP matched as the same by utilizing the location and orientation in the worksite coordinate system WCS of the at least one camera CA, PCA with each respective two-dimensional worksite environment image WIM, wherein the detected feature points DFP matched as the same with determined identification information, location data and static rating are determined as a plurality of the map feature points MFP.

The discussion relating to the static rating above is applicable herein too, with the difference that herein the static rating is determined by utilizing the location and possibly orientation as well in the worksite coordinate system WCS of the at least one camera CA, PCA with each respective two-dimensional worksite environment image WIM instead of the identification information and location data of the at least three detected reference feature points DRFP. In other words, when an image is taken the location and orientation data and their accuracy information, i.e., for example accuracy estimation determined, of the camera CA, PCA that took the image may be used in the exact time instant when the image was taken. Static rating may, in addition, contain detected feature point DFP accuracy information derived from image location/orientation measurements and Bundle Adjustment computations.

Differences in static rating of map feature points MFP come for example from where the map feature point MFP is located and the distance between the camera CA, PCA in time when the images were taken and which kind of is the distinguishable feature DF that become as map feature point MFP. If the map feature point MFP is located on thin tree or thin branch, the semantic classification may give it a lower rating compared to thick tree or thick branch detected in about same circumstances. Still higher rating may in identical circumstances be given to map feature point MFP located at a window corner of a building. Still, if the circumstances vary, superiority in static rating of map feature points MFP located at a window corner of a building, thin tree, thin branch, thick tree or thick branch varies a lot, for example because of differences in the distance from and/or accuracy of the camera CA, PCA to these objects in time when those images were taken and differing weather or lightning conditions in time when each image were taken or regarding each object, i.e. whether each one of the objects were imaged in the shadows, sunny, foggy or rainy circumstances. All in all, there is plenty of variables that affect the static rating. Information relating to the static rating and the static rating itself may be included in the identification information of each map feature point MFP.

Rating is useful in situations where there is plenty of map feature points MFP available, since determining the location and orientation of the machine may be carried out using map feature points MFP having higher rating, i.e. by discarding at current location at least temporarily the map feature points MFP having lower rating. It may be selected for example a rating value threshold where map feature points MFP having too low value are not used in determining the location and orientation of the machine 1. Another approach could be by selecting an amount of highest rated map feature points MFP located in area where the positioning camera PCA is directed to with regards to the latest determined location and orientation of the positioning camera PCA. The approach taking into account previously determined location and orientation of the positioning camera PCA may additionally use dynamic rating which is discussed later.

According to an embodiment, it is further determined overall rating for the detected feature points DFP, the overall rating comprising at least one of static rating or dynamic rating, i.e., static rating and/or dynamic rating, and the dynamic rating is determined for each of the plurality of the determined map feature points MFP with regards to each positioning camera PCA individually taking into account previously determined location and orientation, or heading of each of the at least one positioning camera PCA. Heading or orientation of each of the at least one positioning camera PCA here refers to the viewing angle sector of each positioning camera PCA. If a number of map features points MFP are not even close to a viewing area where a positioning camera PCA is viewing, these map feature points MFP may get the lowest dynamic rating for that positioning camera PCA, which may be for example 0, i.e., zero or empty. Overall rating may be sum of static and dynamic rating, or overall rating may be product of static and dynamic rating. Thus, for example a map feature point locating behind one positioning camera PCA could get overall rating as zero, which would mean that determining the location and orientation of the machine would not try to find such map feature point MFP from images taken at that time by the respective one positioning camera PCA. On the other hand, if there were another positioning camera PCA residing in the other side of the machine 1 having its orientation, or heading, about 180 degrees different than the previously mentioned "one positioning camera PCA", this another positioning camera PCA would possibly rate the dynamic rating for the respective map feature point MPF as 1, or full or highest. Still there would be a chance that the map feature point MPF in question could reside in between the two positioning cameras PCA and thus with both camera's the dynamic rating could be 0, i.e., zero or empty.

According to this embodiment, as discussed above the dynamic rating is determined for each of the plurality of the determined map feature points MFP relative to each positioning camera PCA by individually considering previously determined location and orientation of each of the at least one positioning camera PCA. Herein a different weighting, i.e., dynamic rating may be applied for each map feature point MFP in addition or alternatively based on a realized distance of the respective positioning camera PCA from the detected feature point DFP corresponding to the map feature point MFP in question.

The overall rating is then either the static rating or the dynamic rating or a combination or a weighted combination of the static rating and the dynamic rating determined for the map feature point MFP in question and for each positioning camera PCA in question.

According to an embodiment, the overall rating is at least one of the static rating or the dynamic rating, and the overall rating is at least two-tiered.

According to this embodiment the overall rating is the static rating or the dynamic rating or a combination of the static rating and the dynamic rating. Additionally, the overall rating is at least two-tiered, i.e., comprising at least two different levels, whereby each map feature point MFP that relate to the respective detected feature point DFP and for example the accuracy or other data relating to the points usefulness at each time instant thereof, may be classified into different rating classes or ratings based on for example the accuracy and other identification information of the detected feature point DFP corresponding to the map feature point MFP in question and the location of each map feature point MFP with respect to each positioning camera PCA and the orientation, i.e., viewing angle sector thereof. The map feature points corresponding to the detected reference feature points DRFP typically have the highest accuracies because of the preset markers at known positions in the worksite 14 and are therefore typically classified to have the highest tier of ranking.

According to an embodiment, at least the map feature points MFP having the lowest-tiered overall rating are discarded if the amount of a plurality of the map feature points is above threshold, wherein the threshold is determined manually and/or automatically.

According to this embodiment, in case of the number of the map feature points MFP applicable to be applied in the feature point map is unnecessary high, the map feature points MFP having low accuracy may be discarded, as also discussed earlier regarding usefulness of ratings. This reduces the computational power needed for determining the location and orientation of the machine 1 and/or increases the rapidity of the determination of the location and orientation of the machine 1. The determination of the threshold may be based for example on history data about the number and other related data of the detected reference points DFP in the worksite 14 in question, and it may be updated based on the data received during a working phase presently ongoing.

A Third Embodiment to Provide Map Feature Points to Create a Feature Point Map Herein it is disclosed a third embodiment for determining a plurality of map feature points MFP for creating of the feature point map, i.e., a third embodiment for determining from a worksite environment WE a plurality of distinguishable features DF as a plurality of map feature points MFP, wherein the plurality of the map feature points MFP has at least identification information and location data, wherein the identification information comprises at least one unique identifier like feature descriptor for the map feature point MFP and the location data comprises at least three-dimensional location of the map feature point MFP in the worksite 14.

According to this third embodiment the map feature points MFP to create the feature point map are determined at least in part from data retrieved from an earthmoving information model, wherein the earthmoving information model is based on at least one of: Geospatial Information System (GIS), Building Information Modelling (BIM), Infra or Infrastructure Building Information Modelling (I-BIM), Civil Information Model (CIM) or SmartCity Platform. The earthmoving information model comprises a classification system that may define meanings and properties of different kind of infrastructures and -models and different substructures thereof, such as different layers of foundations structures, filling layers, surface layers etc., for the worksite 14.

In the earthmoving information model the planned final structure may have been divided into a number of sub-structures to be completed so as to complete the planned final structure. Each working phase may, in turn, comprise specific working instructions even in the form of a number of specific individual operations to be carried out by the machine 1 to complete the working phase in question.

According to this embodiment the earthmoving information model may comprise, for example based on some geometry information of structures in the model, at least some distinguishable features DF whose three-dimensional location is known in the model and which may be retrieved from the model to be used as basis of new map feature points MFP. The basis of new map feature point MFP may include information in the identification information and location data, but identification information may not include the feature descriptor needed for the feature to become a map feature point MFP. The feature descriptor may be generated by taking at least one image containing the feature area and its surroundings. Another way may be to identify from generated map feature points MFP or from distinguishable features DF determined from the plurality of two-dimensional worksite environment images WIM taken such features which locations are identifiable in the earthmoving information model, i.e. the earthworks information model and generate location data for these features from earthworks information model and feature descriptors from the at least one image where the feature may be found as distinguishable feature. If the feature descriptor for the feature was taken from a distinguishable feature found only from one image, the map feature point MFP generated would contain only one feature descriptor, although there may be more than one feature descriptor each of them relating to a respective image wherein the feature exists.

Alternatively, the step of determining from the worksite environment WE a plurality of distinguishable features DF as a plurality of map feature points MFP further comprises further map feature points MFP being determined at least in part from data retrieved from an earthmoving information model, wherein the earthmoving information model is based on at least one of: Geospatial Information System (GIS), Building Information Modelling (BIM), Infra or Infrastructure Building Information Modelling (I-BIM), Civil Information Model (CIM) or SmartCity Platform.

Alternatively, the plurality of the map feature points MFP are determined either according to the first embodiment as disclose above to provide the map feature points MFP to create the feature point map or according to the second embodiment as disclosed above to provide the map feature points MFP to create the feature point map, and additionally at least in part from data retrieved from an earthmoving information model, wherein the earthmoving information model is based on at least one of: Geospatial Information System (GIS), Building Information Modelling (BIM), Infra or Infrastructure Building Information Modelling (I-BIM), Civil Information Model (CIM) or SmartCity Platform.

FIG. 8 discloses schematically some earthmoving information models, i.e., earthworks information models.

A Fourth Embodiment to Provide Map Feature Points to Create a Feature Point Map Herein it is disclosed a fourth embodiment for determining a plurality of map feature points MFP for creating the feature point map, i.e., a fourth embodiment for determining from a worksite environment WE a plurality of distinguishable features DF as a plurality of map feature points MFP, wherein the plurality of the map feature points MFP has at least identification information and location data, wherein the identification information comprises at least one unique identifier like feature descriptor for the map feature point MFP and the location data comprises at least three-dimensional location of the map feature point MFP in the worksite 14.

According to this fourth embodiment the map feature points MFP to create the feature point map are determined as a combined set of the map feature points MFP according to the methods disclosed in at least two embodiments of the first embodiment, the second embodiment or the third embodiment above to provide the map feature points to create the feature point map.

Figure 7B:
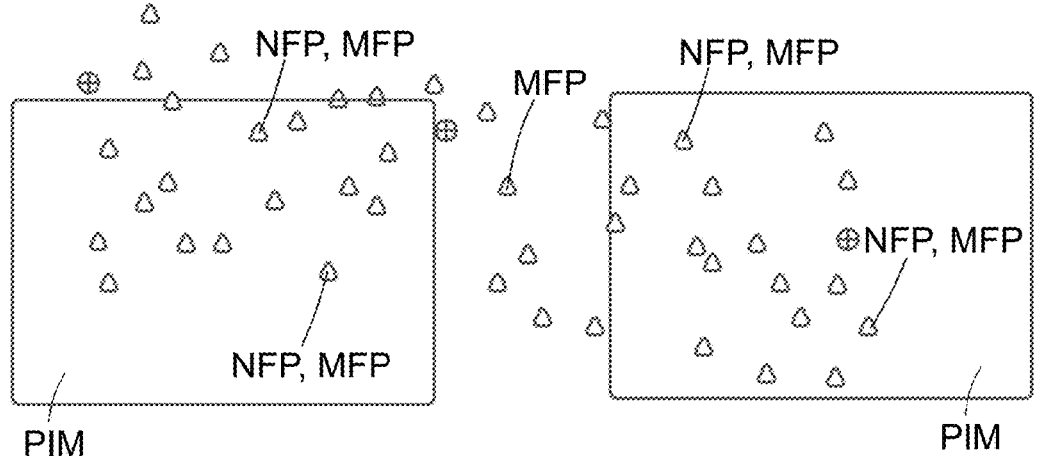
Figure 7C:
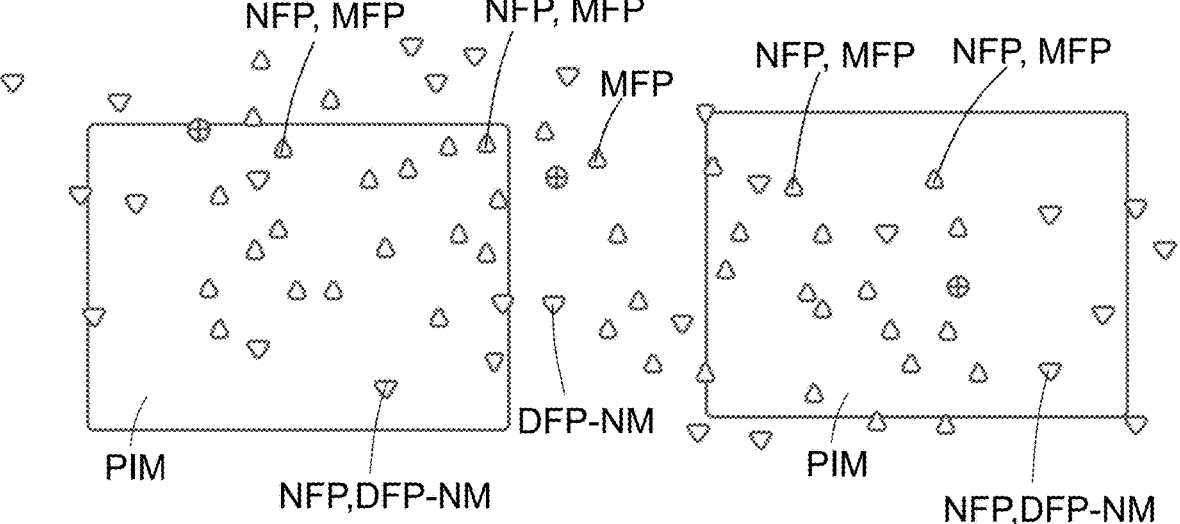

Referring back to FIGS. 2a and 2b and the related description, FIGS. 7a, 7b and 7c show schematically, in view of FIGS. 2a and 2b, embodiments to determine the location and the orientation of the machine 1 in the worksite 14. When the pre-created feature point map comprising the map feature points MFP described above is available, the location and orientation of the machine 1 moving in the worksite 14 may be determined.

For implementing this, the method comprises taking, during the run on the machine 1, substantially continuously in very short time intervals, such as between 10 to 100 milliseconds, two-dimensional positioning images PIM by each of the at least one positioning camera PCA, the average being about 50 milliseconds time interval in each positioning camera PCA. In the event of the machine 1 stopping at the worksite 14 without making any operating action for implementing working phases, the time interval for taking the positioning images PIM may be extended.

At the same time when the two-dimensional positioning images PIM are taken, it is detected distinguishable features DF from the two-dimensional positioning images PIM as navigation feature points NFP and it is determined two-dimensional image coordinates, i.e., image pixel coordinates, for each navigation feature point NFP in each respective positioning image PIM, wherein each of the navigation feature points NFP has at least identification information. The content of these two-dimensional positioning images PIM therefore somewhat resembles the content of the worksite environment images WIM shown for example in FIG. 5c, as can be seen in FIG. 7b.

At the same time when the two-dimensional positioning images PIM are taken, and the content thereof are analysed for detecting distinguishable features DF from the positioning images PIM as navigation feature points NFP and for determining two-dimensional image coordinates for each navigation feature point NFP in the positioning images, the navigation feature points NFP are matched with the plurality of the map feature points MFP in the pre-created feature point map, whereby the identification information of the navigation feature points are matched with the identification information of at least one of: map feature points MFP or detected feature points not matched DFM-NM.

In response to the matching of the navigation feature points NFP with the map feature points MFP, the location and orientation of the machine 1 in the worksite may be determined based at least on:
  the location data of matched at least one of: map feature points MFP or detected feature points not matched DFP-NM,
  the two-dimensional image coordinates of corresponding matched navigation feature points NFP, and the determined intrinsic parameter set and the determined location and orientation in the machine coordinate system MCS of each corresponding positioning camera PCA.

The location and orientation of the machine 1 may be determined in at least two different ways, and in both ways, sensors and/or group of sensors such as the inertial measurement unit IMU residing in the machine 1 may be utilized for providing additional robustness and/or accuracy.

According to a first embodiment or way herein, it may be applied a PnP-solution (perspective-n-point problem) that uses three-dimensional information of the map feature points MFP that match with the navigation feature points NFP. In this solution it is first determined the location and orientation of the at least one positioning camera PCA in the worksite 14 based on the location data of each matched map feature point MFP and the two-dimensional image coordinates of each corresponding matched navigation feature point NFP. The input into the PnP-problem is thus the three-dimensional location data of matched map feature points MFP and the two-dimensional image coordinates of corresponding matched navigation feature points NFP and the output of the PnP-problem is the location and orientation of the at least one positioning camera PCA in the worksite 14. Based on the determined intrinsic parameter set and the determined location and orientation of each corresponding positioning camera PCA in the machine coordinate system MCS, the determined location and orientation of the at least one positioning camera PCA in the worksite 14 may be converted to the location and orientation of the machine 1 in the worksite 14. The PnP-problem generally is discussed in more detail for example in the publication Fischler and Bolles, Random Sample Consensus: A Paradigm for Model Fitting with Applications to Image Analysis and Automated Cartography. Communications of the ACM, June 1981, volume 24, Number 6.

The localization result determined above can be improved via statistical estimation, for example, by solving a nonlinear optimization problem for the variables. Such a nonlinear optimization problem results from the well-known Bayesian statistics, assuming that measurement errors are normally distributed. The basic idea here is to compare feature measurements, i.e., the image coordinates of navigation feature points NFP coming from camera(s) and possible inertial measurements coming from IMU and/or possible other measurements coming from other sensor(s) or group(s) of sensors to artificial/simulated measurements computed by camera projection model and possibly IMU kinematic model and/or possibly a model(s) of the other sensor(s) or group(s) of sensors, assuming some values for the state variable to be solved (current state estimate). Based on the comparison, the current state estimate is changed to reduce the comparison result. This adjustment process is possibly repeated until convergence, i.e., no significant improvement is obtained anymore.

The information of three-dimensional locations of those features matched with the map feature points in the feature point map can be incorporated into the optimization problem as prior information for the features' three-dimensional locations, which are now included as state variables to be solved for. In practice, this means that the function to be minimized in the optimization problem contains terms that compare the current estimate for the three-dimensional location of features matched with the map feature points MFP to the location value stored in the feature point map. Now, when the state estimate is adjusted during optimization, these terms enforce the solution to be such that the three-dimensional feature locations computed from camera measurements do not depart from the three-dimensional locations stored in the feature point map, at least any more than allowed by the three-dimensional location uncertainty information of the map feature points, thereby preventing a drift to be accumulated to the determined localization result.

According to a second embodiment or way herein, the location and orientation of the machine 1 is determined by one single image. Such image, which location and orientation is determined accurately, the intrinsic parameters of the camera CA, PCA that took the image are known and the image comprises at least five detected points having the feature descriptor, such as ORB descriptor or ARUCO code or the like to be able to detect the feature by a positioning camera PCA. Thus, in the second embodiment or way also those detected feature points DFP that were not matched as the same within at least two images may be used in addition to the map feature points MFP, if the detected feature points DFP not matched contain at least the feature descriptor, the image identifier identifying the image where the feature may be found, and two-dimensional image coordinates where the feature is in the image. This image identifier and the two-dimensional image coordinates may reside in a field determining two-dimensional image coordinates with image identifier. These detected feature points DFP that were not matched within two or more images may be extremely usable for example in the edge areas of the worksite or of the edge areas of the work area where the positioning of a machine was deemed to take place.

According to the second embodiment or way herein, one of the at least one positioning camera PCA detects at least five navigation feature points NFP that match with at least one of: map feature points MFP or detected feature points not matched DFP-NM and these points reside in one single image where the image's location and orientation is known, i.e., the camera's CA, PCA location and orientation was known in time the camera CA, PCA took the image. Such images are for example the images of the accepted group of images GIM, since when the location and orientation of each of the accepted group of images GIM is determined, also each image's location and orientation in the group of images GIM is determined. In this embodiment, the location data of the map feature points MFP and of the detected feature points not matched DFP-NM comprise the field determining two-dimensional image coordinates with image identifier. The number of these location data fields in each map feature point MFP determining two-dimensional image coordinates with image identifier is at least one and may be as high as there is images the location and orientation of which is determined having the respective feature detected. Whereas the number of these fields determining two-dimensional image coordinates with image identifier in detected feature points not matched DFP-NM as the same points is only one. Detected feature points not matched DFP-NM as the same are shown for example in FIGS. 5*b*, 5*c* and 7*c* with the triangle with tip pointing downwards and denoted with the reference sign DFP-NM.

In this embodiment or way, identical image identifier in at least one field in the location data of the map feature point MFP or detected feature points not matched DFP-NM verifies these at least five at least one of: map feature points MFP or detected feature points not matched DFP-NM reside in the same image and the image's location and orientation data of the image may be determined, i.e., the location and orientation data where the camera was when the image was taken, by the image identifier. The two-dimensional image coordinates regarding the respective image identifier field in at least five at least one of: map feature points MFP or detected feature points not matched DFP-NM specify wherefrom the respective map feature point MFP or detected feature point not matched DFP-NM is found in the image in image pixels. It should be noted, that in this second solution or way, the location and orientation of the machine 1 may be determined even by using only the detected feature points not matched DFP-NM, for example by using either the leftmost or rightmost worksite environment image WIM in FIG. 5c, if the two-dimensional positioning image PIM is able to detect at least five of them and the location data of the points verifies the points having the same image identifier in the location data field and the image identifier tells the image location and orientation.

Now, when at least five map feature points MFP or detected feature points not matched DFP-NM are found from a single positioning image PIM, the location and orientation of the positioning camera PCA may be determined by using these at least five navigation feature points NFP matched with the map feature points MFP and/or detected feature points not matched DFP-NM in the single image with the determined location and orientation of the single image determined when it is determined for example for each accepted group of images GIM the location and orientation of the group of images GIM, or for example when the image was taken with such a camera CA, PCA the location and orientation of which was determined in time of taking the image.

In this second embodiment or way, the accuracy improvement by optimization may be carried out like in the first embodiment or way.

The solution provides a robust and accurate determining of location and orientation of a machine in a worksite environment. The solution does not accumulate error in the determination of the location and orientation of the machine. It creates from a plurality of distinguishable features a plurality of unique map feature points to be applied by the earthworks machine when the machine is travelling and operating in the worksite. The map feature points comprise identification information, comprising at least the unique identifier such as feature descriptor and location data, comprising at least three-dimensional location thereof in the worksite environment, and/or comprising such location data fields that comprise two-dimensional image coordinates with image identifier thus identifying which image or images contain such detected map feature point and wherein the map feature point MFP reside in this image or these images.

Referring to the discussion above relating to applying of semantic information, the robustness of the creation of the feature point map may further be improved by semantic information obtained with the distinguishable features. Semantic information may for example comprise information about a permanence of an object where the at least one distinguishable feature DF is related to. Objects possibly completely vanishing from the worksite after some time or possibly at least changing their position in the worksite are not preferably applied as a fixing point for a map feature point in a feature point map intended to a long-term use. Therefore, a semantic information may for example be applied to intentionally allocate map feature points to objects that are robustly present in the worksite environment.

The accuracy of the creation of the feature point, as well as the accuracy of the determination of the location and orientation of the earthworks machine in the worksite may also be improved with calibrating the camera intended to be used for the application in question. The camera intended to be used to detect distinguishable features applicable as the map feature points for the feature point map may be calibrated at a beginning of the procedure for the creating of the feature point map. The camera intended to be used to detect distinguishable features applicable as the navigation feature points during the travel or operation of the earthworks machine in the worksite may also be calibrated in real-time during the navigation too. When calibrating the camera, its intrinsic parameters are estimated. Camera's intrinsic parameters relate to its internal characteristics, such as its image centre, focal length, skew and lens distortion.

To increase robustness of the determination of the location and orientation of the machine in real-time during the travel and operation of the machine, against for example changes in camera model parameters due to shocks and vibrations appearing, intrinsic camera parameters may be included as variables to be optimized in a non-linear optimization problem constructed from data collected during navigation. This non-linear optimization problem is like described above with the difference that now the intrinsic parameter set of the positioning camera PCA is to be optimized/improved together with other parameters. This requires that the camera parameters need to be observable from the data, i.e., feature measurements taken from different camera locations and therefore it should be selected such data which makes the camera intrinsic parameters observable. A measure for observability can be defined based on estimated parameters' uncertainties, such as the covariance matrix, given a particular data set collected during navigation. A particular data set can here be a specific segment of camera path containing feature measurements made when camera moved through this path. If the observability measure is good enough, an update of the parameters is made. Also, multiple datasets with good observability of camera intrinsic parameters may be included in this estimation. Also, a change in the intrinsic camera parameters can be detected by comparing two different sets of estimates for these parameters like an estimate determined from the most recent dataset with good observability and an estimate from many datasets collected during longer time period: a difference in such estimates indicates a change in the intrinsic camera parameters. This information can be used to decide when parameters need re-estimation. This estimation process runs in parallel to the localization process. After a successfully solving the parameters in this parallel process, the camera intrinsic parameters used in the localization process are replaced by the new parameters.

According to an embodiment, the step of determining the location and orientation of the earthworks machine 1 in the worksite 14 is further based on tracking navigation feature points NFP between successive positioning images PIM, wherein the navigation feature points NFP tracked between the successive positioning images PIM indicate the change in location and orientation of the positioning camera PCA.

This embodiment provides a visual odometry procedure that may be applied for short-term determination of the location and orientation of the machine in the worksite 14 at times when, for some reason, the navigation feature points NFP detected from the positioning images PIM cannot be matched with the map feature points MFP in the feature point MAP. Reasons for using visual odometry might be for example fog, snowing, raining, extremely sunny weather, rime, or sand dust. By this way, determination of location and orientation of the machine is even more robust and it may be managed over short periods of not matching enough navigation feature points NFP to map feature points MFP.

When the matching of the navigation feature points NFP to the map feature points MFP in the feature point map cannot be made for some short time period, the procedure for simultaneous localization and mapping may be started to build a temporary feature point map, based on the solved three-dimensional locations of the features tracked in the positioning images taken, and localizing the machine 1 in this temporary feature point map. In the temporary feature point map, the detected features are used as map feature points.

Figure 9:
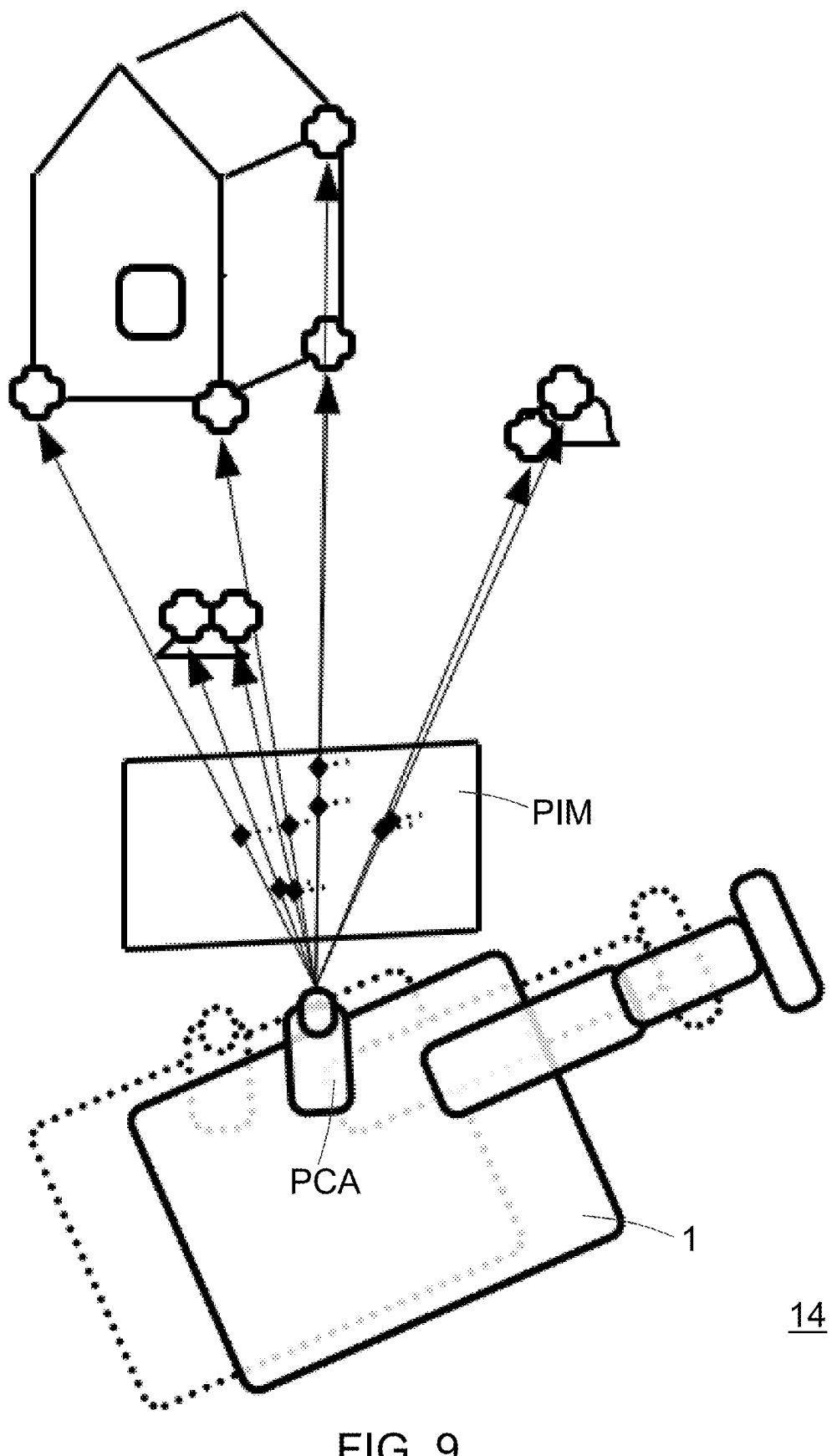
FIG. 9 shows schematically an embodiment relating to a visual odometry procedure.

FIG. 9 shows schematically an embodiment relating to a visual odometry procedure. FIG. 9 shows schematically as a dotted line a machine 1 at a position in the worksite 14 during taking a previous positioning image PIM and as a continuous line the machine 1 at the position in the worksite 14 during taking the positioning image PIM shown in FIG. 9. Features detected in the worksite 14 by the positioning camera PCA are denoted with graphical symbols of filled cross. In the positioning image PIM these detected features are set at locations shown by the graphical symbols of diamond. Dotted lines in the positioning image PIM denote the transfer of positions of the detected features in the positioning images between the previous positioning image and the present positioning image, reflecting the change in the position and orientation of the positioning camera PCA that takes the positioning images PIM.

In the simultaneous localization and mapping procedure the features detected in the newest positioning image are tried to be matched also to the temporary feature point map, and not only to the actual feature point map. This way, assuming that the created temporary feature point map has a good accuracy, a good localization accuracy may be maintained even when unsuccessful feature matching to the actual feature map continues for a long time period.

To build the temporary feature point map with good accuracy, the temporary feature point map may be updated after carrying out successful loop detection and loop closure functionalities. Loop detection means that previously visited area in the worksite 14, i.e., the area of the worksite visible in one or more previous positioning images PIM, can be recognized based on comparing the newest positioning image to positioning images taken at previous times. A characteristic value, for example a so-called Bag-of-Words, can be computed from the positioning images for the comparison. Once a loop is detected, the accumulated drift, i.e., a localization error, during an exploration phase, if localizing by using odometry only, can be corrected with the loop closure functionality, which takes the constraint of the exploration path forming a loop, i.e., the loop constraint, into account and reoptimizes with this constraint the path and the local map built during the exploration. This process runs in parallel to the real-time localization process. After successful reoptimization, the temporary feature point map may be updated with the new map points.

According to an embodiment, the location and orientation of the earthworks machine 1 is further determined in an earthworks information model, wherein earthworks information is based on at least one of Geospatial Information System (GIS), Building Information Modelling (BIM), Infra or Infrastructure Building Information Modelling (I-BIM), Civil Information Model (CIM) and SmartCity Platform. According to this embodiment, the earthworks information model in use for the worksite 14 may be updated in substantially real-time to contain the information about the location and orientation of the machine 1 in the worksite 14. This information may for example be used as a further possible measure to detect possible crossings of safety boundaries set around other machines or persons operating in the worksite 14 and, if necessary, to control the machine 1 to stop.

According to an embodiment, a tool of the earthworks machine 1 is controlled to create a structure described in the earthworks information model. According to this embodiment, the machine 1 may receive from the earthworks information model for example specific working instructions, even in a form of specific control actions to be carried out as controlled by a control unit 11, so as to complete the intended planned structure described in the earthworks information model.

According to an embodiment, as-built data is generated to be accompanied with the earthworks information model. According to this embodiment, the earthworks information model may be supplemented with as-built data describing the progress of the worksite 14. The as-built data about the progress of the worksite 14 may be generated in the earthworks machine 1 or by the earthworks machine 1 when the machine 1 is travelling in the worksite 14 or when the machine 1 is carrying out a work task to complete the planned structure of the worksite 14. Therefore, the machine 1 may collect the as-built data relating not only to the progress of the worksite 14 in response to the work tasks carried out by the machine 1 in question but also as-built data relating to the progress of the worksite 14 in response to the work tasks carried out by other machines in the worksite 14.

According to an embodiment, as-built data is transmitted to at least one of a worksite information management system or a machine operating at the worksite 14. The as-built data may be transmitted in response to completing the planned structure of the worksite 14, in response to completing a sub-structure forming part of the planned structure or in response to completing a specific individual operation to be carried out for implementing the sub-structure.

It will be obvious to a person skilled in the art that, as the technology advances, the inventive concept can be implemented in various ways. The invention and its embodiments are not limited to the examples described above but may vary within the scope of the claims.

What is claimed is:

1. A method for determining a location and orientation of an earthworks machine in a worksite coordinate system, the method comprising:

generating a feature point map by determining from a worksite environment a plurality of distinguishable features as a plurality of map feature points by taking a plurality of two-dimensional worksite environment images by at least one camera having determined intrinsic parameter set, where the intrinsic parameter set defines for images the formation of each image pixel from a real-world view;

detecting from each of the plurality of two-dimensional worksite environment images at least one of:

distinguishable features for associating each distinguishable feature with identification information and image coordinates of the respective two-dimensional worksite environment image as detected feature points; or distinguishable features as reference feature points, wherein the reference feature points are preset in a worksite and associated with identification information and location data in the worksite coordinate system, for additionally associating each of the reference feature points with image coordinates of the respective two-dimensional worksite environment image as detected reference feature points;

creating at least one group of images by binding the worksite environment images with each other by having at least five at least one of: the detected feature points matched as the same points in the work-site environment images or the detected reference fea-ture points matched as the same points in the worksite environment images to be bound;

accepting each group of images containing at least two worksite environment images and at least three detected reference feature points matched as the same points; and determining for each accepted group of images a location and orientation of the group of images and an identi-fication information and location data for detected feature points matched as the same points by utilizing the identification information and location data of the at least three detected reference feature points contained; wherefrom the detected feature points matched as the same points and the detected reference feature points matched as the same points are determined as map feature points for the feature point map;

wherein the plurality of map feature points of the feature point map has at least identification informa-tion and location data, wherein the identification information comprises at least a unique identifier identifying the distinguishable feature; and the location data comprises three-dimensional location in the worksite coordinate system;

setting at least one positioning camera on the earthworks machine, the at least one positioning camera having a determined intrinsic parameter set and a determined location and orientation in a machine coordinate sys-tem;

providing the earthworks machine with the feature point map;

taking two-dimensional positioning images by at least one positioning camera;

detecting distinguishable features from the two-dimen-sional positioning images as navigation feature points and determining two-dimensional image coordinates and identification information for each navigation fea-ture point; and matching identification information of the navigation fea-ture points with the identification information of the map feature points of the feature point map; wherein determining the location and orientation of the earthworks machine in the worksite coordinate system based at least on:

the location data of matched map feature points;

the two-dimensional image coordinates of correspond-ing matched navigation feature points; and the determined intrinsic parameter set of each of the at least one positioning camera and the determined location and orientation in the machine coordinate system of each corresponding positioning camera.

2. The method as claimed in claim 1, wherein the step of determining from a worksite environment a plurality of distinguishable features as a plurality of map feature points further comprises:

taking a plurality of two-dimensional worksite environ-ment images by at least one camera, the at least one camera having:

a determined intrinsic parameter set and a determined location in the worksite coordinate system;

detecting from each of the plurality of two-dimensional worksite environment images distinguishable features and determining the distinguishable feature with image coordinates of respective two-dimensional worksite environment image as detected feature points, creating at least one group of images having detected feature points matched as the same points in the work-site environment images; and determining for each group of images an identification information and location data for detected feature points matched as the same by utilizing the location in the worksite coordinate system of the at least one camera with each respective two-dimensional worksite environment image; wherein the detected feature points matched as the same with determined identification information and location data are determined as a plurality of map feature points.

3. The method as claimed in claim 2, wherein determining for each group of images an identification information and location data for detected feature points matched as the same further comprises determining static rating for the detected feature points matched as the same by utilizing the location in the worksite coordinate system of the at least one camera with each respective two-dimensional worksite environment image; wherein the detected feature points matched as the same with determined identification information, location data and static rating are determined as a plurality of the map feature points.

4. The method as claimed in claim 1, wherein in the step of determining from a worksite environment a plurality of distinguishable features as a plurality of map feature points further comprises further map feature points determined at least in part from data retrieved from an earthmoving information model, wherein the earthmoving information model is based on at least one of: Geospatial Information System, Building Information Modelling, Infra or Infra-structure Building Information Modelling, Civil Information Model or SmartCity Platform.

5. The method as claimed in claim 1, wherein the step of determining for each accepted group of images a location and orientation of the group of images and an identification information and location data for detected feature points matched as the same further comprises determining a static rating for the detected feature points matched as the same by utilizing the identification information and location data of the at least three detected reference feature points contained; wherein at least one of: the detected feature points matched as the same with determined identification information, loca-tion data and the static rating or detected reference feature points associated with identification informa-tion and location data are determined as a plurality of the map feature points.

6. The method as claimed in claim 5, wherein the method further comprises determining overall rating, the overall rating comprising at least one of: static rating or dynamic rating, and the dynamic rating is determined for each of the plurality of the determined map feature points with regards to each positioning camera individually taking into account previously determined location and orientation of each of the at least one positioning camera.

7. The method as claimed in claim 6, wherein the overall rating is at least one of: the static rating or the dynamic rating, and the overall rating is at least two-tiered.

8. The method as claimed in claim 7, wherein at least the map feature points having the lowest-tiered overall rating are discarded if the amount of a plurality of the map feature points is above threshold, wherein the threshold is determined at least one of: manually or automatically.

9. The method as claimed in claim 1, wherein the step of determining the location and orientation of the earthworks machine in the worksite is further based on tracking navigation feature points between successive positioning images, wherein the navigation feature points tracked between the successive positioning images indicate the change in location and orientation of the positioning camera.

10. The method as claimed in claim 1, wherein the camera intrinsic parameters are updated by at least one data set collected during navigation, wherein the data set is created by a specific segment of camera path containing feature measurements made when camera moved through this path.

11. The method as claimed in claim 1, wherein the method further comprises determining the location and orientation of the earthworks machine in an earthworks information model, wherein earthworks information is based on at least one of Geospatial Information System, Building Information Modelling, Infra or Infrastructure Building Information Modelling, Civil Information Model and SmartCity Platform.

12. The method as claimed in claim 11, wherein the method further comprises controlling a tool of the earthworks machine to create a structure described in the earthworks information model.

13. The method as claimed in claim 12, wherein the method further comprises generating as-built data to be accompanied with the earthworks information model.

14. The method as claimed in claim 13, wherein the method further comprises transmitting as-built data to at least one of a worksite information management system or a machine operating at the worksite.

15. The method as claimed in claim 11, wherein the method further comprises generating as-built data to be accompanied with the earthworks information model.

16. The method as claimed in claim 15, wherein the method further comprises transmitting as-built data to at least one of worksite information management system or a machine operating at the worksite.

* * * * *